United States Patent
Xu et al.

(10) Patent No.: US 12,101,396 B2
(45) Date of Patent: Sep. 24, 2024

(54) DEVICE SHARING METHOD AND ELECTRONIC DEVICE

(71) Applicant: Huawei Technologies Co., Ltd., Guangdong (CN)

(72) Inventors: Bingkun Xu, Xi'an (CN); Yong Qiao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 254 days.

(21) Appl. No.: 17/789,143

(22) PCT Filed: Oct. 29, 2020

(86) PCT No.: PCT/CN2020/124926
§ 371 (c)(1),
(2) Date: Jun. 24, 2022

(87) PCT Pub. No.: WO2021/135593
PCT Pub. Date: Jul. 8, 2021

(65) Prior Publication Data
US 2023/0037251 A1 Feb. 2, 2023

(30) Foreign Application Priority Data
Dec. 31, 2019 (CN) .......................... 201911415938.9

(51) Int. Cl.
*H04L 9/08* (2006.01)
*H04L 9/32* (2006.01)
*H04L 9/40* (2022.01)

(52) U.S. Cl.
CPC .......... *H04L 9/0825* (2013.01); *H04L 9/0822* (2013.01); *H04L 9/0827* (2013.01); *H04L 9/3247* (2013.01); *H04L 63/062* (2013.01)

(58) Field of Classification Search
None
See application file for complete search history.

(56) References Cited

U.S. PATENT DOCUMENTS

| | | | |
|---|---|---|---|
| 10,129,223 B1 | 11/2018 | Bhattacharyya et al. | |
| 2011/0055585 A1* | 3/2011 | Lee ........................ | H04L 9/3226 713/183 |

(Continued)

FOREIGN PATENT DOCUMENTS

| | | |
|---|---|---|
| CN | 104769894 A | 7/2015 |
| CN | 106249608 A | 12/2016 |

(Continued)

*Primary Examiner* — Trang T Doan
(74) *Attorney, Agent, or Firm* — WOMBLE BOND DICKINSON (US) LLP

(57) ABSTRACT

A first device obtains a public key of a first home device and a first message leaving key that is used to encrypt an offline message between the first device and the first home device; obtains a public key of a second device and a second message leaving key that is used to encrypt an offline message between the first device and the second device; obtains a third message leaving key used to encrypt an offline message between the second device and the first home device; encrypts the public key of the second device and the third message leaving key by using the first message leaving key, to obtain first encrypted information, and requests a server to push the first encrypted information to the first home device; and encrypts the public key of the first home device and the third message leaving key by using the second message leaving key.

15 Claims, 28 Drawing Sheets

(56) References Cited

U.S. PATENT DOCUMENTS

| | | | |
|---|---|---|---|
| 2014/0129835 A1 | 5/2014 | Suryavanshi et al. | |
| 2016/0218875 A1 | 7/2016 | Le Saint et al. | |
| 2019/0312726 A1* | 10/2019 | Sierra | H04L 63/104 |
| 2020/0052905 A1* | 2/2020 | Mathias | H04L 9/3265 |

FOREIGN PATENT DOCUMENTS

| | | |
|---|---|---|
| CN | 106603807 A | 4/2017 |
| CN | 107819673 A | 3/2018 |
| CN | 110086634 A | 8/2019 |
| JP | 2010134749 A | 6/2010 |
| JP | 2016213839 A | 12/2016 |
| JP | 2017511028 A | 4/2017 |
| JP | 2017514197 A | 6/2017 |
| JP | 2018007039 A | 1/2018 |
| JP | 2018152796 A | 9/2018 |
| JP | 2019185789 A | 10/2019 |
| WO | 2016037447 A1 | 3/2016 |
| WO | 2017135866 A1 | 8/2017 |
| WO | 2018177188 A1 | 10/2018 |

* cited by examiner

TO

DEVICE SHARING METHOD AND ELECTRONIC DEVICE

This application is a national stage of International Application No. PCT/CN2020/124926, filed on Oct. 29, 2020, which claims priority to Chinese Patent Application No. 201911415938.9, filed on Dec. 31, 2019. Both of the aforementioned applications are hereby incorporated by reference in their entireties.

TECHNICAL FIELD

Embodiments of this application relate to the field of communications technologies and the field of smart home technologies, and in particular, to a device sharing method and an electronic device.

BACKGROUND

With development of an electronic information technology, a smart home gradually enters people's daily life. The smart home may use a house as a platform to integrate home devices related to home life for controlling over a wireless local area network such as a wireless fidelity (Wi-Fi) network, to improve home security, convenience, and comfort.

Specifically, a management application (app) for controlling a home device may be installed on an electronic device (such as a mobile phone or a tablet computer) of a user. A prerequisite for controlling the home device by using the management app is that the electronic device and the home device exchange respective public keys by using the management app.

After exchanging the respective public keys, the electronic device and the home device can perform signature verification on respective signaling by using the respective public keys, so that normal communication can be performed. The electronic device and the home device may complete the public key exchange in the following manners: Manner (1): The management app in the electronic device is bound to the home device to complete the public key exchange; and Manner (2): The electronic device receives sharing of another electronic device to complete the public key exchange.

In Manner (2), a management app (a sharing client for short) in the electronic device on a sharing side, the management app (an acceptance client for short) in the electronic device on a sharing acceptance side, and the home device need to be online at the same time to complete the public key exchange between the acceptance client and the home device. If any one of the sharing client, the acceptance client, and the home device is not online, the public key exchange cannot be completed, and consequently sharing of the home device cannot be completed. In other words, offline sharing of the home device cannot be completed.

SUMMARY

This application provides a device sharing method and an electronic device, to implement offline sharing of a home device.

According to a first aspect, this application provides a device sharing method. The method may be used by a first device to share a home device with a second device. A first app is installed on the first device, and the first app is logged in to by using a first account.

The device sharing method may include: The first device obtains a first message leaving key used for encryption; the first device obtains a public key of a first home device; the first device obtains a second message leaving key and a public key of a second account associated with the second device; the first device obtains a third message leaving key used for encryption; the first device encrypts the public key of the second account and the third message leaving key by using the first message leaving key, to obtain first encrypted information, and requests a server to push the first encrypted information to the first home device; and the first device encrypts the public key of the first home device and the third message leaving key by using the second message leaving key, to obtain second encrypted information, and requests the server to push the second encrypted information to the second device.

The first message leaving key is used to encrypt an offline message between the first device and the first home device. The second message leaving key is used to encrypt an offline message between the first device and the second device. The third message leaving key is used to encrypt an offline message between the second device and the first home device. The public key of the first home device is used to perform verification on an online message from the first home device. The second account is an account associated with the first app installed on the second device, and the public key of the second account is used to perform verification on an online message from the second device. A public key of the first account is used to perform verification on an online message from the first device.

It should be noted that an "online message" between two devices in this application is a message transmitted when the two devices are both in an online state. For example, an "online message" between the second device and the first home device is a message transmitted between the second device and the first home device through the first app when the first app in the second device is logged in to by using an account (for example, the second account) and both the second device and the first home device are in an online state.

In this case, the second device may digitally sign, by using a private key of the second account, an online message sent to the first home device, and the first home device may perform signature verification on the online message from the second device by using the public key of the second account. Similarly, the first home device may digitally sign, by using a private key of the first home device, an online message sent to the second device, and the second device may perform signature verification on the online message from the first home device by using the public key of the first home device.

An "offline message" between two devices in this application is a message sent by a device in an online state to a device in an offline state when one of the two devices is in an online state and the other device is in an offline state.

For example, an "offline message" sent by the first home device to the second device is a message sent by the first home device to the second device through the first app when the first home device is in an online state and the second device is in an offline state because the first app in the second device is not logged in to by using an account (for example, the second account). In this case, the first home device may encrypt, by using the third message leaving key, the offline message transmitted to the second device, and the second device may decrypt the offline message from the first home device by using the third message leaving key.

For another example, an "offline message" sent by the second device to the first home device is a message sent by the second device to the first home device through the first app when the first home device is in an offline state and the second device is in an online state because the first app in the second device is logged in to by using an account (for example, the second account). In this case, the second device may encrypt, by using the third message leaving key, the offline message transmitted to the first home device, and the first home device may decrypt the offline message from the second device by using the third message leaving key.

After the first device requests the server to push the first encrypted information including the public key of the second account and the third message leaving key to the first home device, the first home device may obtain the public key of the second account and the third message leaving key. After the first device requests the server to push the second encrypted information including the public key of the first home device and the third message leaving key to the second device, the second device may obtain the first home device of the second account and the third message leaving key.

It can be learned from the foregoing descriptions that the first home device can perform online and offline communication with the second device after obtaining a public key of the second device (that is, the public key of the second account) and the third message leaving key, and the second device can perform online and offline communication with the first home device after obtaining the public key of the first home device and the third message leaving key. In other words, according to the method in this embodiment of this application, the first device may share the first home device with the second device, so that the second device obtains control of the first home device.

In addition, even if the first home device is offline, the first device may request, by using an offline message, the server to push the first encrypted information to the first home device. Even if the second device is offline, the first device may request, by using an offline message, the server to push the second encrypted information to the second device. In other words, even if either the first home device or the second device is offline, the first device may share the first home device with the second device. Therefore, the method in this embodiment of this application can implement offline sharing of a home device.

Further, the first device may encrypt the public key of the second account and the third message leaving key by using the first message leaving key (that is, a message leaving key used to encrypt the offline message between the first device and the first home device), and after obtaining the first encrypted information, request the server to push the first encrypted information to the first home device. The first device may encrypt the public key of the first home device and the third message leaving key by using the second message leaving key (that is, a message leaving key used to encrypt the offline message between the first device and the second device), and after obtaining the second encrypted information, request the server to push the second encrypted information to the second device.

The first encrypted information is obtained through encryption by using the first message leaving key. The first message leaving key is used to encrypt the offline message between the first device and the first home device. Both the first device and the first home device learn of the first message leaving key, but another device (for example, the server) does not learn of the first message leaving key. In this case, the server cannot decrypt the first encrypted information, and therefore cannot learn of the public key of the second account and the third message leaving key, so that user information security can be protected.

The second encrypted information is obtained through encryption by using the second message leaving key. The second message leaving key is used to encrypt the offline message between the first device and the second device. Both the first device and the second device learn of the second message leaving key, but another device (for example, the server) does not learn of the second message leaving key. In this case, the server cannot decode the second encrypted information, and therefore cannot learn of the public key of the first home device and the third message leaving key, so that user information security can be protected.

In one embodiment, that the first device obtains a public key of a first home device may include: The first device accesses a first wireless network provided by the first home device; the first device negotiates a shared key with the first home device over the first wireless network by using a password authenticated key exchange (password authenticated key exchange, PAKE) protocol; the first device receives third encrypted information from the first home device over the first wireless network, where the third encrypted information is obtained by encrypting the public key of the first home device by using the shared key; and the first device decrypts the third encrypted information by using the shared key, to obtain the public key of the first home device.

The first wireless network provided by the first home device is an unencrypted wireless network and consequently is an insecure network. Therefore, in addition to the first device, another device located around the first home device may also find the first wireless network and access the first wireless network. The another device may negotiate a shared key with the first home device, to implement binding to the first home device. In this embodiment of this application, using the PAKE protocol to negotiate the shared key can prevent another device from being bound to the first home device. In addition, using the shared key to encrypt the public key of the first home device can prevent another device from learning of the public key of the first home device, so that user information security can be protected.

In one embodiment, that the first device obtains a first message leaving key may include: The first device generates the first message leaving key. For example, the first device may randomly generate the first message leaving key. In one embodiment, that the first device obtains a first message leaving key may include: The first device receives the first message leaving key that is set by a user.

The device sharing method may further include: The first device encrypts the public key of the first account, the first message leaving key, and access information of a second wireless network by using the shared key, to obtain fourth encrypted information; and the first device sends the fourth encrypted information to the first home device over the first wireless network. The access information includes an identifier and an access password of the second wireless network. The public key of the first account is used to perform verification on the online message from the first device.

The shared key is negotiated by the first device and the first home device by using the PAKE protocol, and another device does not learn of the shared key. Therefore, the public key of the first account, the first message leaving key, and the access information of the second wireless network are encrypted by using the shared key, so that user information security can be protected.

In one embodiment, the device sharing method may further include: The first device obtains verification information of the second device; and the first device obtains a shared block from the server based on the second account.

The verification information includes the second account and the shared key. For example, the verification information may include any one of the following forms: a two-dimensional code, a bar code, or an electronic label. The foregoing shared block is obtained by the second device by encrypting the public key of the second account and the second message leaving key by using the shared key, and is uploaded to the server.

That the first device obtains a second message leaving key and a public key of the second account may include: The first device decrypts the shared block by using the shared key, to obtain the public key of the second account and the second message leaving key.

The shared key is included in the verification information. The first device may obtain the verification information of the second device, to obtain the second account and the shared key. In other words, only the first device and the second device learn of the shared key, and another device (for example, the server) does not learn of the shared key. Therefore, the second device uploads the shared block to the server. However, the shared block is obtained by encrypting the public key of the second account and the second message leaving key by using the shared key. The server does not learn of the shared key, and cannot decrypt the shared block. Therefore, the server cannot obtain the public key of the second account and the second message leaving key. In this way, user information security can be protected.

In one embodiment, the method may further include: The first device displays a first interface of the first app, where the first interface is used to manage one or more home devices; the first device receives a first operation performed by a user on a first interface, where the first operation is used to trigger the first device to share the first home device with the second device; and in response to the first operation, the first device sends a first request message to the server, where the first request message is used to request the server to indicate the second device to generate the verification information and upload the shared block to the server.

In one embodiment, the method further includes: In response to the first operation, the first device generates a second challenge code for the second account, where the first request message further includes the second challenge code.

In one embodiment, the shared block further includes a first challenge code. Generally, if the server does not tamper with the second challenge code from the first device, the first challenge code is the same as the second challenge code. However, if the server tampers with the second challenge code from the first device, the first challenge code is different from the second challenge code. The server may tamper with the second challenge code from the first device, and send a tampered first challenge code to the second device that is logged in to by using the second account. The server may further tamper with a sharing-receiving account. For example, the server may send the second challenge code to another account different from the second account.

To prevent the server from tampering with a challenge code or an account, after obtaining the first challenge code, the first device may determine whether the first challenge code is the second challenge code generated by the first device for the second account. Specifically, the method in this embodiment of this application may further include: The first device decrypts the shared block by using the shared key, to obtain the first challenge code; and the first device determines whether the first challenge code is the same as the second challenge code, where the second challenge code is generated by the first device for the second account. That the first device obtains a third message leaving key includes: If the first challenge code is the same as the second challenge code, the first device generates the third message leaving key.

According to a second aspect, this application provides a device sharing method. The method is used by a second device to accept a home device shared by a first device. A first app is installed on the second device, and the first app is logged in to by using a second account.

The device sharing method may include: The second device obtains a second message leaving key; the second device receives second encrypted information from a server; and the second device decrypts the second encrypted information by using the second message leaving key, to obtain a public key of a first home device and a third message leaving key.

It should be noted that for detailed descriptions of the second encrypted information, the second message leaving key, the public key of the first home device, and the third message leaving key, refer to related content in the first aspect and any possible design manner of the first aspect. Details are not described herein again in this embodiment of this application.

It can be learned from the related descriptions in the first aspect that the second device can perform online and offline communication with the first home device after obtaining the public key of the first home device and the third message leaving key. In other words, according to the method in this embodiment of this application, the second device may accept the first home device shared by the first device, and obtain control of the first home device.

In one embodiment, that the second device obtains a second message leaving key may include: The second device receives a first challenge code from the server; and the second device generates the second message leaving key. In one embodiment, the second device may further receive a second message leaving key that is set by a user.

In one embodiment, after the second device receives the first challenge code from the server, the method in this application further includes: The second device generates a shared key; the second device encrypts a public key of the second account, the first challenge code, and the second message leaving key by using the shared key, to obtain a shared block; and the second device sends the shared block to the server.

It can be understood that the foregoing shared block is obtained by encrypting the public key of the second account and the second message leaving key by using the shared key. The server does not learn of the shared key, and cannot decrypt the shared block. Therefore, the server cannot obtain the public key of the second account and the second message leaving key. In this way, user information security can be protected.

In one embodiment, after the second device receives the first challenge code from the server, the method in this application further includes: The second device generates verification information, and displays the verification information, where the verification information includes the second account and the shared key. The verification information includes at least one of the following forms: a two-dimensional code, a bar code, or an electronic label.

It can be understood that, because the verification information includes the second account and the shared key, the first device may obtain the second account and the shared key after obtaining the verification information. In this way, the first device may download the shared block from the server based on the second account, and decrypt the shared block by using the shared key, to obtain the public key of the second account, the first challenge code, and the second message leaving key.

According to a third aspect, this application provides a device sharing method. The method may be used by a first device to share a home device with a second device. The method may include: A first home device obtains a first message leaving key; the first home device receives first encrypted information from a server; and the first home device decrypts the first encrypted information by using the first message leaving key, to obtain a public key of a second account and a third message leaving key.

It should be noted that for detailed descriptions of the first message leaving key, the first encrypted information, the public key of the second account, and the third message leaving key, refer to the descriptions in the first aspect and the possible design manners of the first aspect. Details are not described herein again in this embodiment of this application.

It can be learned from the related descriptions in the first aspect that the first home device can perform online and offline communication with the second device after obtaining a public key of the second device and the third message leaving key. In other words, according to the method in this embodiment of this application, the first home device may obtain the public key of the second account and the third message leaving key, and is controlled by the second device. In other words, the home device can be shared.

In one embodiment, that a first home device obtains a first message leaving key may include: The first home device provides a first wireless network, and allows the first device to access the first wireless network; the first home device negotiates a shared key with the first device over the first wireless network by using a PAKE protocol; the first home device receives fourth encrypted information from the first device over the first wireless network, where the fourth encrypted information is encrypted by using the shared key, and the fourth encrypted information includes the first message leaving key; and the first home device decrypts the fourth encrypted information by using the shared key, to obtain the first message leaving key.

The shared key is negotiated by the first device and the first home device by using the PAKE protocol, and another device does not learn of the shared key. Therefore, the first message leaving key is encrypted by using the shared key, so that user information security can be protected.

With reference to the third aspect, in another possible design manner, the fourth encrypted information further includes a public key of a first account and access information of a second wireless network. The public key of the first account is used to perform verification on an online message from the first device. The access information includes an identifier and an access password of the second wireless network. The method in this application may further include: The first home device accesses the second wireless network based on the access information of the second wireless network. That the first home device receives first encrypted information from a server includes: The first home device receives the first encrypted information from the server over the second wireless network.

In one embodiment, the method may further include: The first home device encrypts a public key of the first home device by using the shared key, to obtain third encrypted information; and the first home device sends the third encrypted information to the first device over the first wireless network. The shared key is negotiated by the first device and the first home device by using the PAKE protocol, and another device does not learn of the shared key. Therefore, the public key of the first home device is encrypted by using the shared key, so that user information security can be protected.

According to a fourth aspect, this application provides a device sharing method. The method may be used by a first device to share a home device with a second device. The method may include: A server receives a second request message from the first device, where the second request message includes first encrypted information and an identifier of a first home device; in response to the second request message, the server sends the first encrypted information to the first home device; the server receives a third request message from the first device, where the third request message includes second encrypted information and a second account; and in response to the third request message, the server sends the second encrypted information to the second device after a first application app of the second device is logged in to by using the second account.

It should be noted that for detailed descriptions of the first encrypted information, a public key of the second account, a third message leaving key, the second encrypted information, and a public key of the first home device, refer to the descriptions in the first aspect and any possible design manner of the first aspect. Details are not described herein again in this application.

After the server sends the first encrypted information including the public key of the second account and the third message leaving key to the first home device, the first home device may obtain the public key of the second account and the third message leaving key. After the server sends the second encrypted information including the public key of the first home device and the third message leaving key to the second device, the second device may obtain the public key of the second account and the third message leaving key.

It can be learned from the foregoing descriptions that the first home device can perform online and offline communication with the second device after obtaining a public key of the second device (that is, the public key of the second account) and the third message leaving key, and the second device can perform online and offline communication with the first home device after obtaining the public key of the first home device and the third message leaving key. In other words, according to the method in this embodiment of this application, the first device may share the first home device with the second device, so that the second device obtains control of the first home device.

In addition, even if the first home device is offline when the server receives the second request message, the service may still push the first encrypted information to the first home device after the first home device goes online. Even if the second device is offline when the server receives the third request message, the server may still push the second encrypted information to the second device after the second device goes online. In other words, even if either the first home device or the second device is offline, the first device may share the first home device with the second device. In other words, the method in this embodiment of this application can implement offline sharing of a home device.

Further, after obtaining the first encrypted information by encrypting the public key of the second account and the third message leaving key by using a first message leaving key (that is, a message leaving key used to encrypt an offline message between the first device and the first home device), the first device may request the server to push the first encrypted information to the first home device. After obtaining the second encrypted information by encrypting the public key of the first home device and the third message leaving key by using a second message leaving key (that is, a message leaving key used to encrypt an offline message between the first device and the second device), the first device may request the server to push the second encrypted information to the second device.

The first encrypted information is obtained through encryption by using the first message leaving key. The first message leaving key is used to encrypt an offline message between the first device and the first home device. Both the first device and the first home device learn of the first message leaving key, but another device (for example, the server) does not learn of the first message leaving key. In this case, the server cannot decode the first encrypted information, and therefore cannot learn of the public key of the second account and the third message leaving key, so that user information security can be protected.

The second encrypted information is obtained through encryption by using the second message leaving key. The second message leaving key is used to encrypt an offline message between the first device and the second device. Both the first device and the second device learn of the second message leaving key, but another device (for example, the server) does not learn of the second message leaving key. Therefore, the server cannot decode the second encrypted information, and therefore cannot learn of the public key of the first home device and the third message leaving key, so that user information security can be protected.

In one embodiment, the first encrypted information is obtained by encrypting the public key of the first home device and the third message leaving key by using the second message leaving key. Before the server receives the third request message from the first device, the method further includes: The server receives a shared block from the second device, and stores the shared block based on the second account; the server receives an obtaining request from the first device; and in response to the obtaining request, the server sends the shared block to the first device. The obtaining request is used to obtain the shared block corresponding to the second account. The foregoing shared block is encrypted, and the shared block includes the public key of the second device and the second message leaving key.

In one embodiment, before the server receives the shared block from the second device, and stores the shared block based on second account, the method further includes: The server receives a first request message from the first device, where the first request message includes the second account and a second challenge code; and in response to the first request message, the server sends a first challenge code to the second device after the first app of the second device is logged in to by using the second account, where the first challenge code is the same as the second challenge code, the first challenge code is used to indicate the second device to upload the shared block to the server, and the shared block further includes the first challenge code.

According to a fifth aspect, this application provides an electronic device. The electronic device is the foregoing first device, a first app is installed on the first device, and the first app is logged in to by using a first account. The first device includes a communications module, a memory, and one or more processors. The communications module, the memory, and the processor are coupled. The memory is configured to store computer program code, where the computer program code includes computer instructions. When the computer instructions are executed by the processor, the first device is enabled to perform the following operations: obtaining a first message leaving key; obtaining a public key of a first home device; obtaining a second message leaving key and a public key of a second account; obtaining a third message leaving key; encrypting the public key of the second account and the third message leaving key by using the first message leaving key, to obtain first encrypted information, and requesting a server to push the first encrypted information to the first home device; and encrypting the public key of the first home device and the third message leaving key by using the second message leaving key, to obtain second encrypted information, and requesting the server to push the second encrypted information to a second device.

It should be noted that, for detailed descriptions of the first message leaving key, the public key of the first home device, the second message leaving key, the second account, the public key of the second account, the third message leaving key, and a public key of the first account in the fifth aspect and any possible design manner of the fifth aspect of this application, refer to the related descriptions in the first aspect and any possible design manner of the first aspect. Details are not described herein again in this embodiment of this application.

In one embodiment when the computer instructions are executed by the processor, the first device is further enabled to perform the following operations: accessing a first wireless network provided by the first home device; negotiating a shared key with the first home device over the first wireless network by using a PAKE protocol; receiving third encrypted information from the first home device over the first wireless network, where the third encrypted information is obtained by encrypting the public key of the first home device by using the shared key; and decrypting the third encrypted information by using the shared key, to obtain the public key of the first home device.

In one embodiment, when the computer instructions are executed by the processor, the first device is further enabled to perform the following operations: generating the first message leaving key; encrypting the public key of the first account, the first message leaving key, and access information of a second wireless network by using the shared key, to obtain fourth encrypted information, where the access information includes an identifier and an access password of the second wireless network, and the public key of the first account is used to perform verification on an online message from the first device; and sending the fourth encrypted information to the first home device over the first wireless network.

In one embodiment, when the computer instructions are executed by the processor, the first device is further enabled to perform the following operations: obtaining verification information of the second device, where the verification information includes the second account and a shared key; obtaining a shared block from the server based on the second account, where the shared block is obtained by the second device by encrypting the public key of the second account and the second message leaving key by using the shared key, and is uploaded to the server; and decrypting the shared block by using the shared key, to obtain the public key of the second account and the second message leaving key.

In one embodiment, the first device further includes a display. When the computer instructions are executed by the processor, the first device is further enabled to perform the following operations: displaying a first interface of the first app, where the first interface is used to manage one or more home devices; receiving a first operation performed by a user on the first interface, where the first operation is used to trigger the first device to share the first home device with the second device; and in response to the first operation, sending a first request message to the server, where the first request message is used to request the server to indicate the second device to generate the verification information and upload the shared block to the server.

In one embodiment, the shared block further includes a first challenge code. When the computer instructions are executed by the processor, the first device is further enabled to perform the following operations: decrypting the shared block by using the shared key, to obtain the first challenge code; determining whether the first challenge code is the same as a second challenge code, where the second challenge code is generated by the first device for the second account; and if the first challenge code is the same as the second challenge code, generating, by the first device, the third message leaving key.

In one embodiment, when the computer instructions are executed by the processor, the first device is further enabled to perform the following operation: in response to the first operation, generating a second challenge code for the second account, where the first request message further includes the second challenge code.

According to a sixth aspect, this application provides an electronic device. The electronic device is a second device, a first app is installed on the second device, and the first app is logged in to by using a second account. The second device includes a communications module, a memory, and one or more processors. The communications module, the memory, and the processor are coupled. The memory is configured to store computer program code, where the computer program code includes computer instructions. When the computer instructions are executed by the processor, the second device is enabled to perform the following operations: obtaining a second message leaving key; receiving second encrypted information from a server; and decrypting the second encrypted information by using the second message leaving key, to obtain a public key of a first home device and a third message leaving key.

It should be noted that, for detailed descriptions of the second message leaving key, the second encrypted information, the public key of the first home device, the third message leaving key, first encrypted information, a public key of the second account, and the like in the sixth aspect and any possible design manner of the sixth aspect of this application, refer to the related descriptions in the second aspect and any possible design manner of the second aspect. Details are not described herein again in this embodiment of this application.

In one embodiment, when the computer instructions are executed by the processor, the second device is further enabled to perform the following operations: receiving a first challenge code from the server; and generating the second message leaving key.

In one embodiment when the computer instructions are executed by the processor, the second device is further enabled to perform the following operations: generating a shared key after receiving the first challenge code from the server; encrypting the public key of the second account, the first challenge code, and the second message leaving key by using the shared key, to obtain a shared block; and sending the shared block to the server.

In one embodiment when the computer instructions are executed by the processor, the second device is further enabled to perform the following operations: after receiving the first challenge code from the server, generating verification information, and displaying the verification information, where the verification information includes the second account and the shared key. The verification information includes at least one of the following forms: a two-dimensional code, a bar code, or an electronic label.

According to a seventh aspect, this application provides a home device. The home device is a first home device, and the first home device includes a communications module, a memory, and one or more processors. The communications module, the memory, and the processor are coupled. The memory is configured to store computer program code, where the computer program code includes computer instructions. When the computer instructions are executed by the processor, the first home device is enabled to perform the following operations: obtaining a first message leaving key; receiving first encrypted information from a server; and decrypting the first encrypted information by using the first message leaving key, to obtain a public key of a second account and a third message leaving key.

It should be noted that, for detailed descriptions of the first message leaving key, the first encrypted information, the public key of the second account, the third message leaving key, and the like in the seventh aspect and any possible design manner of the seventh aspect of this application, refer to the related descriptions in the third aspect and any possible design manner of the third aspect. Details are not described herein again in this embodiment of this application.

In one embodiment, when the computer instructions are executed by the processor, the first home device is further enabled to perform the following operations: providing a first wireless network, and allowing a first device to access the first wireless network; negotiating a shared key with the first device over the first wireless network by using a password authenticated key exchange PAKE protocol; receiving fourth encrypted information from the first device over the first wireless network, where the fourth encrypted information is encrypted by using the shared key, and the fourth encrypted information includes the first message leaving key; and decrypting the fourth encrypted information by using the shared key, to obtain the first message leaving key.

In one embodiment, the fourth encrypted information further includes a public key of a first account and access information of a second wireless network, the public key of the first account is used to perform verification on an online message from the first device, and the access information includes an identifier and an access password of the second wireless network.

When the computer instructions are executed by the processor, the first home device is further enabled to perform the following operations: accessing the second wireless network based on the access information of the second wireless network; and receiving the first encrypted information from the server over the second wireless network.

In one embodiment, when the computer instructions are executed by the processor, the first home device is further enabled to perform the following operations: encrypting a public key of the first home device by using the shared key, to obtain third encrypted information; and sending the third encrypted information to the first device over the first wireless network.

According to an eighth aspect, this application provides a server. The server includes a communications module, a memory, and one or more processors. The communications module, the memory, and the processor are coupled. The memory is configured to store computer program code, where the computer program code includes computer instructions. When the computer instructions are executed by the processor, the server is enabled to perform the following operations: receiving a second request message from a first device, where the second request message includes first encrypted information and an identifier of a first home device; in response to the second request message, sending the first encrypted information to the first home device; receiving a third request message from the first device, where the third request message includes second encrypted information and a second account; and in response to the third request message, sending the second encrypted information to a second device after a first app of the second device is logged in to by using the second account.

It should be noted that, for detailed descriptions of the first encrypted information, a public key of the second account, a third message leaving key, the second encrypted information, the second account, and the like in the eighth aspect and any possible design manner of the eighth aspect of this application, refer to the related descriptions in the fourth aspect and any possible design manner of the fourth aspect. Details are not described herein again in this embodiment of this application.

In one embodiment, the first encrypted information is obtained by encrypting the public key of the second account and the third message leaving key by using a second message leaving key. When the computer instructions are executed by the processor, the server is further enabled to perform the following operations: before receiving the third request message from the first device, receiving a shared block from the second device, and storing the shared block based on the second account, where the shared block is encrypted, and the shared block includes a public key of the second device and the second message leaving key; receiving an obtaining request from the first device, where the obtaining request is used to obtain the shared block corresponding to the second account; and in response to the obtaining request, sending the shared block to the first device.

In one embodiment when the computer instructions are executed by the processor, the server is further enabled to perform the following operations: before receiving the shared block from the second device, and storing the shared block based on the second account, receiving a first request message from the first device, where the first request message includes the second account and a second challenge code; and in response to the first request message, sending a first challenge code to the second device after the first app of the second device is logged in to by using the second account, where the first challenge code is the same as the second challenge code. The first challenge code is used to indicate the second device to upload the shared block to the server, and the shared block further includes the first challenge code.

According to a ninth aspect, this application provides a chip system. The chip system includes one or more interface circuits and one or more processors. The interface circuit and the processor are connected to each other through a line.

The chip system may be applied to an electronic device including a communications module and a memory. The interface circuit is configured to receive a signal from the memory in the electronic device, and send the received signal to the processor, where the signal includes computer instructions stored in the memory. When the processor executes the computer instructions, the electronic device may perform the method according to any one of the first aspect and the possible design manners of the first aspect or the method according to any one of the second aspect and the possible design manners of the second aspect.

Alternatively, the chip system may be applied to a home device including a communications module and a memory. The interface circuit is configured to receive a signal from the memory in the home device, and send the received signal to the processor, where the signal includes computer instructions stored in the memory. When the processor executes the computer instructions, the home device may perform the method according to any one of the third aspect and the possible design manners of the third aspect.

Alternatively, the chip system may be applied to a server including a communications module and a memory. The interface circuit is configured to receive a signal from the memory in the server, and send the received signal to the processor, where the signal includes computer instructions stored in the memory. When the processor executes the computer instructions, the server may perform the method according to any one of the fourth aspect and the possible design manners of the fourth aspect.

According to a tenth aspect, this application provides a computer-readable storage medium. The computer-readable storage medium includes computer instructions. When the computer instructions are run on an electronic device, the electronic device is enabled to perform the method according to any one of the first aspect and the possible design manners of the first aspect or the method according to any one of the second aspect and the possible design manners of the second aspect. When the computer instructions are run on a home device, the home device is enabled to perform the method according to any one of the third aspect and the possible design manners of the third aspect. When the computer instructions are run on a server, the server is enabled to perform the method according to any one of the fourth aspect and the possible design manners of the fourth aspect.

According to an eleventh aspect, this application provides a computer program product. When the computer program product runs on a computer, the computer is enabled to perform the method according to any one of the first aspect and the possible design manners of the first aspect, the method according to any one of the second aspect and the possible design manners of the second aspect, the method according to any one of the third aspect and the possible design manners of the third aspect, or the method according to any one of the fourth aspect and the possible design manners of the fourth aspect.

It can be understood that, for beneficial effects of the electronic device according to any one of the fifth aspect and the possible design manners of the fifth aspect, the electronic device according to any one of the sixth aspect and the possible design manners of the sixth aspect, the home device according to any one of the seventh aspect and the possible design manners of the seventh aspect, the server according to any one of the eighth aspect and the possible design manners of the eighth aspect, the chip system according to the ninth aspect, the computer-readable storage medium according to the tenth aspect, and the computer program product according to the eleventh aspect, refer to the beneficial effects of the method according to any one of the first aspect and the possible design manners of the first aspect, the method according to any one of the second aspect and the possible design manners of the second aspect, the method according to any one of the third aspect and the possible design manners of the third aspect, and the method according to any one of the fourth aspect and the possible design manners of the fourth aspect. Details are not described herein again.

BRIEF DESCRIPTION OF DRAWINGS

FIG. 5D-1 to FIG. 5D-3 are schematic diagrams of a display interface of another device according to an embodiment of this application;

FIG. 5E-1 and FIG. 5E-2 are schematic diagrams of a display interface of another device according to an embodiment of this application;

FIG. 6A-1 to FIG. 6A-3 are flowcharts of another device sharing method according to an embodiment of this application;

FIG. 6B-1 and FIG. 6B-2 are schematic diagrams of a display interface of another device according to an embodiment of this application;

DESCRIPTION OF EMBODIMENTS

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

An electronic device (for example, a first device) may be bound to a home device to obtain control of the home device. It should be noted that one home device can be bound to only one electronic device. The electronic device may install a first app (which is also referred to as a management app) of the home device, and perform login by using an account registered for the first app. Then, the electronic device may be bound to the home device through the first app. For a specific method in which an electronic device is bound to a home device, refer to detailed descriptions in the following embodiments. Details are not described herein again.

It should be noted that, although one home device can be bound to only one electronic device, another electronic device (for example, a second device) can accept sharing by an electronic device (for example, the first device) bound to a home device, to obtain control of the home device.

An embodiment of this application provides a device sharing method. The method may be used by the first device to share with the second device, a home device bound to the first device. The method in this embodiment of this application can implement offline sharing of the home device, and can further improve information security in a home device sharing process.

The following describes implementations of the embodiments of this application in detail with reference to the accompanying drawings.

Figure 1:
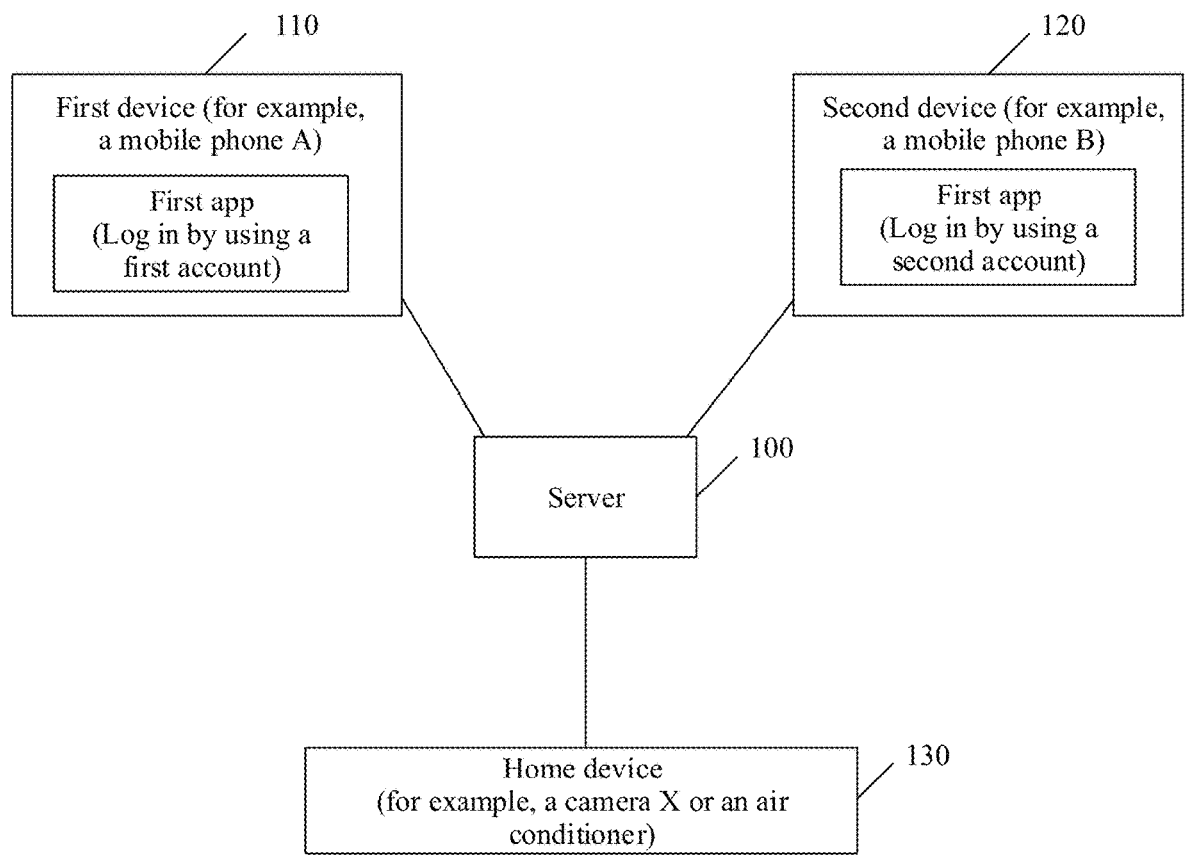
FIG. 1 is a schematic diagram of a system architecture to which a device sharing method is applied according to an embodiment of this application.

FIG. 1 is a schematic diagram of a system architecture to which a device sharing method is applied according to an embodiment of this application. As shown in FIG. 1, the system may include a server 100, a first device 110, a second device 120, and a home device 130. A first app is installed on both the first device 110 and the second device 120. The server 100 is a management server of the first app.

The first device 110 logs in to, by using a first account, the first app installed on the first device, and the second device 120 logs in to, by using a second account, the first app installed on the second device. The first device 110 that is logged in to by using the first account is bound to the home device 130, and may share, through the server 100, the home device 130 with the second device 120 that is logged in to by using the second account.

For example, an electronic device (for example, the first device or the second device) in this embodiment of this application may be a device on which the foregoing management app can be installed, such as a mobile phone, a tablet computer, a desktop computer, a laptop, a handheld computer, a notebook computer, an ultra-mobile personal computer (UMPC), a netbook, a cellular phone, a personal digital assistant (PDA), or an augmented reality (AR)/virtual reality (VR) device. A specific form of the electronic device is not specially limited in this embodiment of this application.

It should be noted that the first device 110 and the second device 120 may be devices of different types. For example, the first device 110 is a mobile phone, and the second device 120 is a tablet computer. Alternatively, the first device 110 and the second device 120 may be devices of a same type. For example, both the first device 110 and the second device 120 are mobile phones. This embodiment of this application imposes no limitation thereto.

The home device provided in this embodiment of this application may be a device that can access a home wireless local area network, such as a television, a stereo, a camera, an air conditioner, a refrigerator, a smart curtain, a desk lamp, a chandelier, an electric cooker, a security protection device (such as a smart electronic lock), or a personal computer (PC). In addition, the home device in this embodiment of this application may alternatively be an in-vehicle acoustic device, an in-vehicle air conditioner, or the like. A specific form of the home device is not specially limited in this embodiment of this application.

Figure 2:
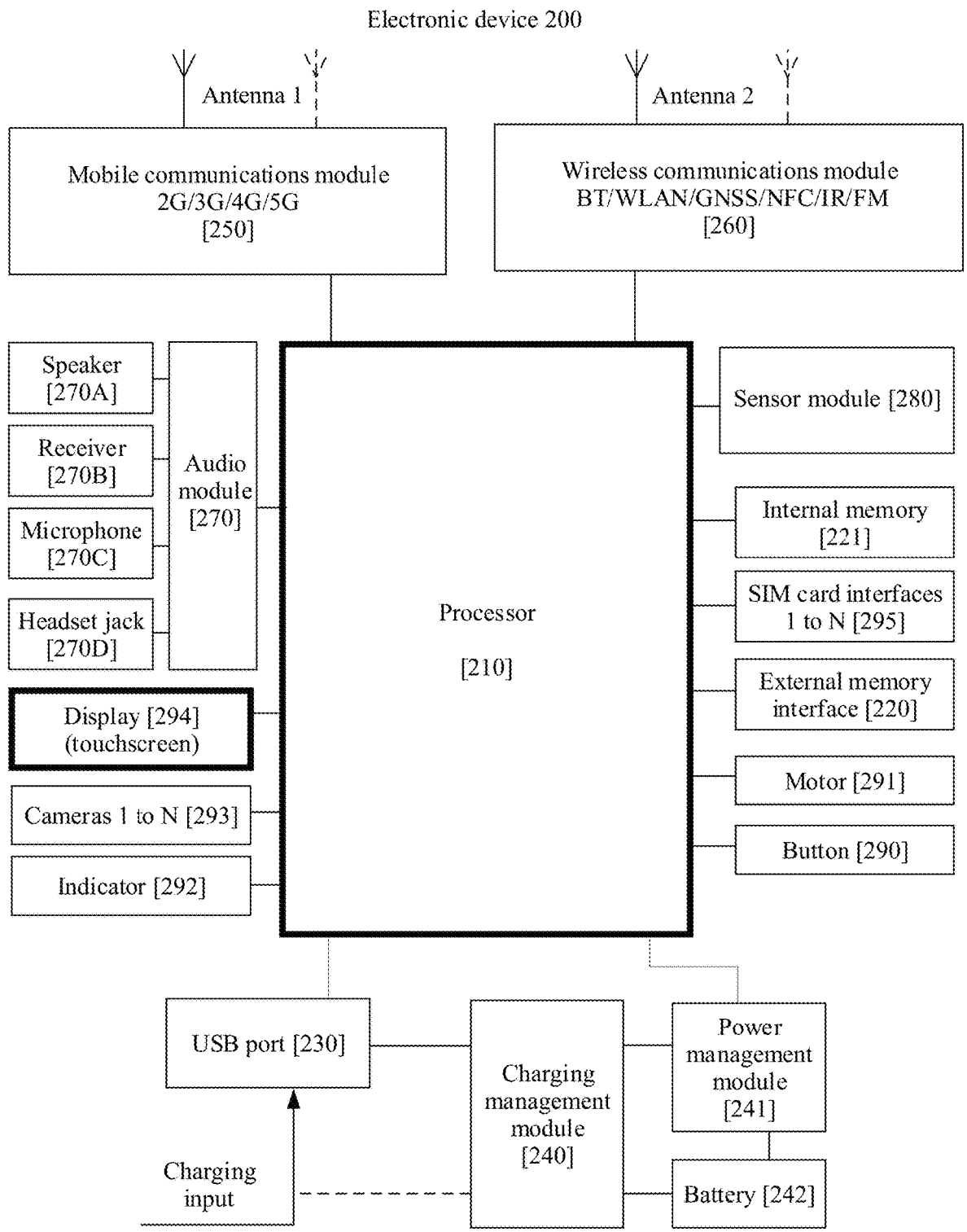
FIG. 2 is a schematic diagram of a hardware structure of an electronic device according to an embodiment of this application.

In this embodiment of this application, an example in which the first device 110 and the second device 120 shown in FIG. 1 are mobile phones is used to describe a structure of the electronic device provided in this embodiment of this application. As shown in FIG. 2, an electronic device 200 (for example, a mobile phone) may include a processor 210, an external memory interface 220, an internal memory 221, a universal serial bus (USB) port 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (SIM) card interface 295, and the like.

The sensor module 280 may include sensors such as a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, and a bone conduction sensor.

It can be understood that the structure shown in this embodiment does not constitute a specific limitation on the electronic device. In some other embodiments, the electronic device 200 may include more or fewer components than those shown in the figure, or may combine some components, or may split some components, or may have different component arrangements. The components shown in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural processing unit (NPU). Different processing units may be independent components, or may be integrated into one or more processors.

The controller may be a nerve center and a command center of the electronic device 200. The controller may generate an operation control signal based on instruction operation code and a time sequence signal, to complete control of instruction fetching and instruction execution.

A memory may be further disposed in the processor 210, and is configured to store an instruction and data. In some embodiments, the memory in the processor 210 is a cache. The memory may store an instruction or data just used or cyclically used by the processor 210. If the processor 210 needs to use the instruction or the data again, the processor 210 may directly invoke the instruction or the data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (uUSB) port, and/or the like.

It can be understood that an interface connection relationship between the modules shown in this embodiment is merely an example for description, and does not constitute a limitation on the structure of the electronic device 200. In some other embodiments, the electronic device 200 may alternatively use an interface connection manner different from that in the foregoing embodiment, or use a combination of a plurality of interface connection manners.

The charging management module 240 is configured to receive a charging input from a charger. The charger may be a wireless charger or a wired charger. The charging management module 240 supplies power to the electronic device by using the power management unit 241 while charging the battery 242.

The power management module 241 is configured to connect the battery 242, the charging management module 240, and the processor 210. The power management unit 241 receives an input from the battery 242 and/or the charging management module 240, and supplies power to the processor 210, the internal memory 221, an external memory, the display 294, the camera 293, the wireless communications module 260, and the like. In some embodiments, the power management module 241 and the charging management module 240 may alternatively be disposed in a same device.

A wireless communication function of the electronic device 200 may be implemented through the antenna 1, the antenna 2, the mobile communications module 250, the wireless communications module 260, the modem processor, the baseband processor, and the like. In some embodiments, the antenna 1 of the electronic device 200 is coupled to the mobile communications module 250, and the antenna 2 is coupled to the wireless communications module 260, so that the electronic device 200 can communicate with a network and another device by using a wireless communications technology.

The antenna 1 and the antenna 2 are configured to transmit and receive an electromagnetic wave signal. Each antenna in the electronic device 200 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 250 can provide a solution, applied to the electronic device 200, to wireless communication including 2G, 3G, 4G, 5G, or the like. The mobile communications module 250 may include at least one filter, a switch, a power amplifier, a low noise amplifier (LNA), and the like. The mobile communications module 250 may receive an electromagnetic wave through the antenna 1, perform processing such as filtering or amplification on the received electromagnetic wave, and transmit the electromagnetic wave to the modem processor for demodulation.

The mobile communications module 250 may further amplify a signal modulated by the modem processor, and convert the signal into an electromagnetic wave for radiation through the antenna 1. In some embodiments, at least some function modules of the mobile communications module 250 may be disposed in the processor 210. In some embodiments, at least some function modules of the mobile communications module 250 and at least some modules of the processor 210 may be disposed in a same device.

The wireless communications module 260 may provide a solution, applied to the electronic device 200, to wireless communication including a wireless local area network (WLAN) (for example, a wireless fidelity (Wi-Fi) network), Bluetooth (BT), a global navigational satellite system (GNSS), frequency modulation (FM), near field communication (NFC), or an infrared (IR) technology. For example, in this embodiment of this application, the electronic device 200 (for example, the first device 110) may access, by using the wireless communications module 260, a temporary network (for example, a Wi-Fi network) provided by the home device 130.

The wireless communications module 260 may be one or more devices that integrate at least one communications processing module. The wireless communications module 260 receives an electromagnetic wave through the antenna 2, performs frequency modulation and filtering on the electromagnetic wave, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

The electronic device 200 implements a display function by using the GPU, the display 294, the application processor, and the like. The GPU is a microprocessor for image processing, and is connected to the display 294 and the application processor. The GPU is configured to perform mathematical and geometric calculation, and perform image rendering. The processor 210 may include one or more GPUs that execute program instructions to generate or change display information.

The display 294 is configured to display an image, a video, and the like. The display 294 includes a display panel. For example, in this embodiment of this application, the display 294 may be configured to display an application interface of the first app, such as a device sharing interface, a device search interface, and a two-dimensional code scanning interface.

The electronic device 200 can implement a shooting function by using the ISP, the camera 293, the video codec, the GPU, the display 294, the application processor, and the like. The ISP is configured to process data fed back by the camera 293. The camera 293 is configured to capture a static image or a video. In some embodiments, the electronic device 200 may include one or N cameras 293, where N is a positive integer greater than 1.

The external memory interface 220 may be configured to connect to an external storage card, for example, a micro SD card, to extend a storage capability of the electronic device 200. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The processor 210 runs the instructions stored in the internal memory 221, to perform various function applications and data processing of the electronic device 200. For example, in this embodiment of this application, the processor 210 may execute the instructions stored in the internal memory 221, and the internal memory 221 may include a program storage area and a data storage area.

The program storage area may store an operating system, an application required by at least one function (for example, a sound playing function and an image playing function), and the like. The data storage area may store data (such as audio data and a phone book) created when the electronic device 200 is used, and the like. In addition, the internal memory 221 may include a high-speed random access memory, or may include a nonvolatile memory, for example, at least one magnetic disk storage device, a flash memory, or a universal flash storage (UFS).

The electronic device 200 may implement audio functions such as music playing and recording functions through the audio module 270, the speaker 270A, the receiver 270B, the microphone 270C, the headset jack 270D, the application processor, and the like.

The button 290 includes a power button, a volume button, and the like. The button 290 may be a mechanical button, or may be a touch button. The motor 291 may generate a vibration prompt. The motor 291 may be configured to produce an incoming call vibration prompt and a touch vibration feedback. The indicator 292 may be an indicator light, and may be configured to indicate a charging status and a power change, or may be configured to indicate a message, a missed call, a notification, and the like. The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro SIM card, a SIM card, and the like.

For ease of understanding, in this embodiment of this application, an example in which the first device 110 installs the first app and registers an account is used to describe a process in which the electronic device (for example, the first device 110 or the second device 120) in this embodiment of this application installs the first app and registers an account.

There is a two-dimensional code or a bar code on an outer package or a housing of a home device (for example, the home device 130). The two-dimensional code or the bar code is used to install the first app (that is, the first application). Specifically, the first device 110 may scan a two-dimensional code or a bar code of the home device 130 to obtain an installation link of the first app, to implement installation of the first app. Alternatively, the first device 110 may install the first app from an application store.

After installing the first app, the first device 110 may start the first app in response to a user operation, register the first account with the server 100 through the first app, and generate a public key and a private key of the first account.

The private key of the first account is used to digitally sign an online message sent by a device (for example, the first device 110) that is logged in to by using the first account to another device (for example, the second device 120). The public key of the first account is used by another device (for example, the second device 120) to perform signature verification on an online message from a device that is logged in to by using the first account.

An account A is used as an example. It is assumed that a mobile phone A performs login by using the account A. The mobile phone A may use a private key of the account A to digitally sign an online message sent by the mobile phone A to a mobile phone B, and the mobile phone B may use a public key of the account A to perform signature verification on the online message from the mobile phone A. In other words, all online messages sent by the mobile phone A to the mobile phone B are digitally signed by using a private key of the mobile phone A. After obtaining a public key of the mobile phone A, the mobile phone B may use the public key of the mobile phone A to perform signature verification on the online message from the mobile phone A, so as to determine whether the online message is tampered with. When registering the first account with the server 100, the first device 110 may further set a login password for the first account. The login password is used for login by using the first account.

It should be noted that, for a method in which the first device 110 installs the first app and registers the first account with the server 100 and a method in which the first device 110 generates the public key and the private key of the first account, refer to related methods in the conventional technology. Details are not described herein again in this embodiment of this application.

A method in which the second device 120 installs the first app and registers the second account with the server 100 is similar to the method in which the first device 110 installs the first app and registers the first account with the server 100. Details are not described herein again. Certainly, after registering the second account with the server 100, the second device 120 may generate a public key and a private key of the second account. For specific functions of the public key and the private key of the second account, refer to the descriptions of the public key and the private key of the first account in the foregoing embodiment. Details are not described herein again.

It should be noted that an "online message" between two devices in this embodiment of this application is a message transmitted when the two devices are both in an online state. For example, an "online message" between the mobile phone A and the mobile phone B is a message transmitted between the mobile phone A and the mobile phone B through the first app when the first app on the mobile phone A is logged in to by using an account (for example, the first account) and is in an online state, and the first app on the mobile phone B is logged in to by using another account (for example, the second account) and is in an online state.

An "offline message" between two devices in this embodiment of this application is a message sent by an online device to an offline device. For example, an "offline message" sent by the mobile phone A to the mobile phone B is a message sent by the mobile phone A to the mobile phone B through the first app when the first app on the mobile phone A is logged in to by using an account (for example, the first account) and is in an online state and the first app on the mobile phone B is in an offline state.

In the following embodiment, an example in which the first device 110 is the mobile phone A, the second device 120 is the mobile phone B, and the home device 130 is a camera X is used to describe the method in this embodiment of this application. The first app is installed on both the mobile phone A and the mobile phone B. In addition, the first app installed on the mobile phone A is logged in to by using the first account, and the first app installed on the mobile phone B is logged in to by using the second account. The camera X may be a surveillance camera installed at home or another place.

It should be noted that, in the following embodiments, a message leaving key Pod is a first message leaving key, a message leaving key Pom is a second message leaving key, and a message leaving key Pmd is a third message leaving key.

It should be noted that, in the embodiments of this application, both the mobile phone A (that is, the first device 110) and the mobile phone B (that is, the second device 120) interact with the server 100 through the first app. The mobile phone A interacts with the mobile phone B through the first app, and the mobile phone A and the mobile phone B interact with the camera X through the first app. The first app is installed on both the mobile phone A and the mobile phone B. The first app installed on the mobile phone A is logged in to by using the first account, and the first app installed on the mobile phone B is logged in to by using the second account.

Figure 3A:
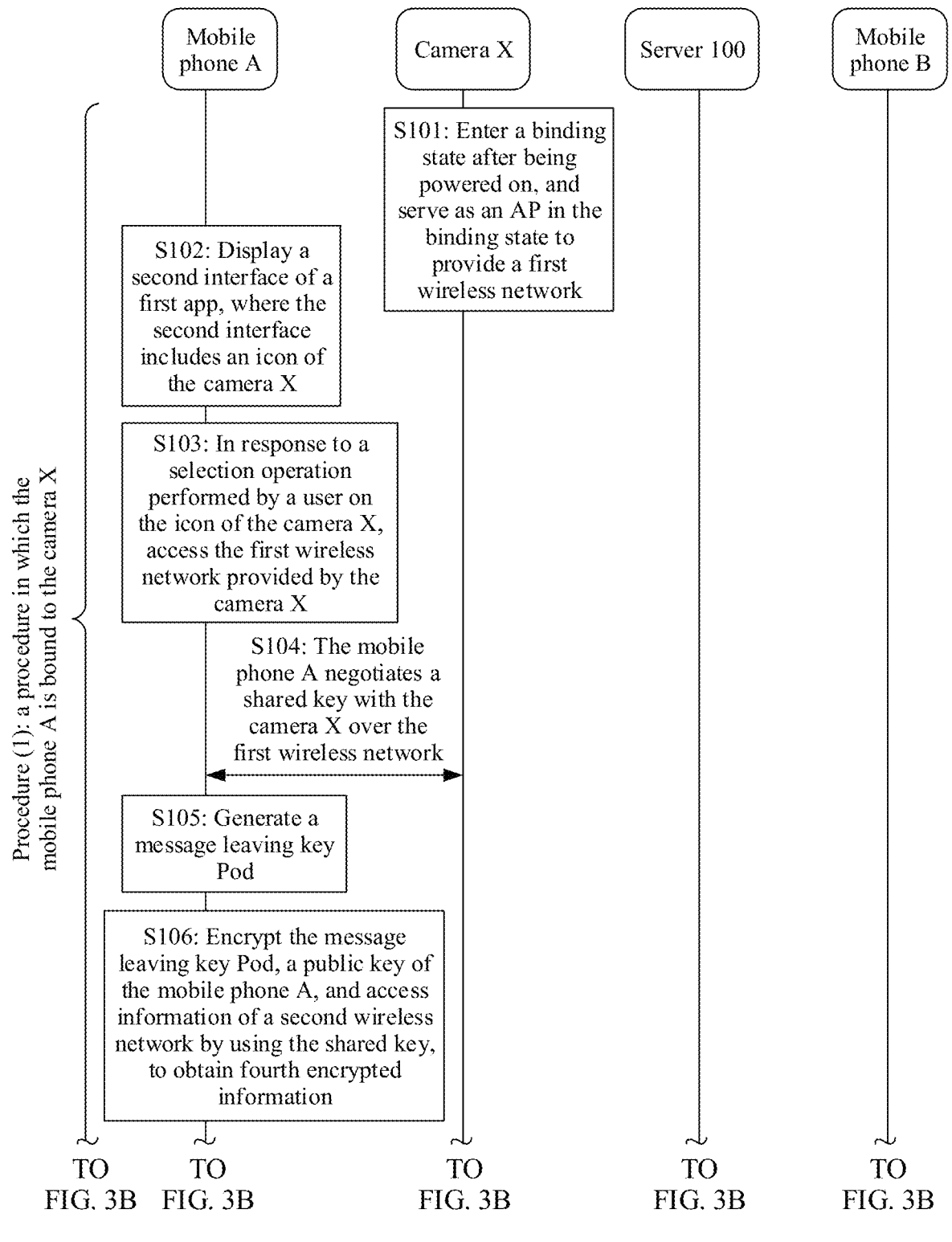
FIG. 3A to FIG. 3C are flowcharts of a device sharing method according to an embodiment of this application.
Figure 3B:
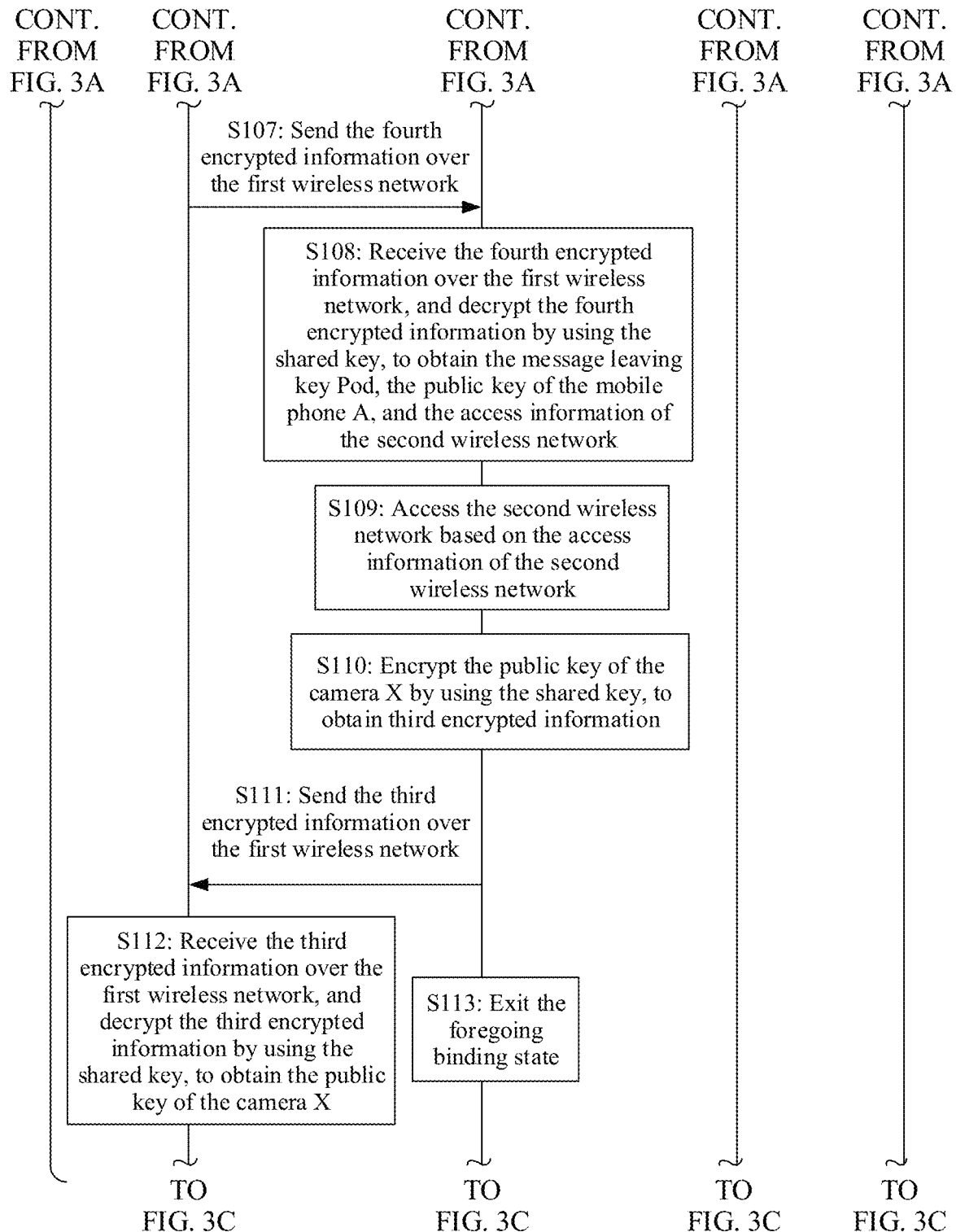
Figure 3C:
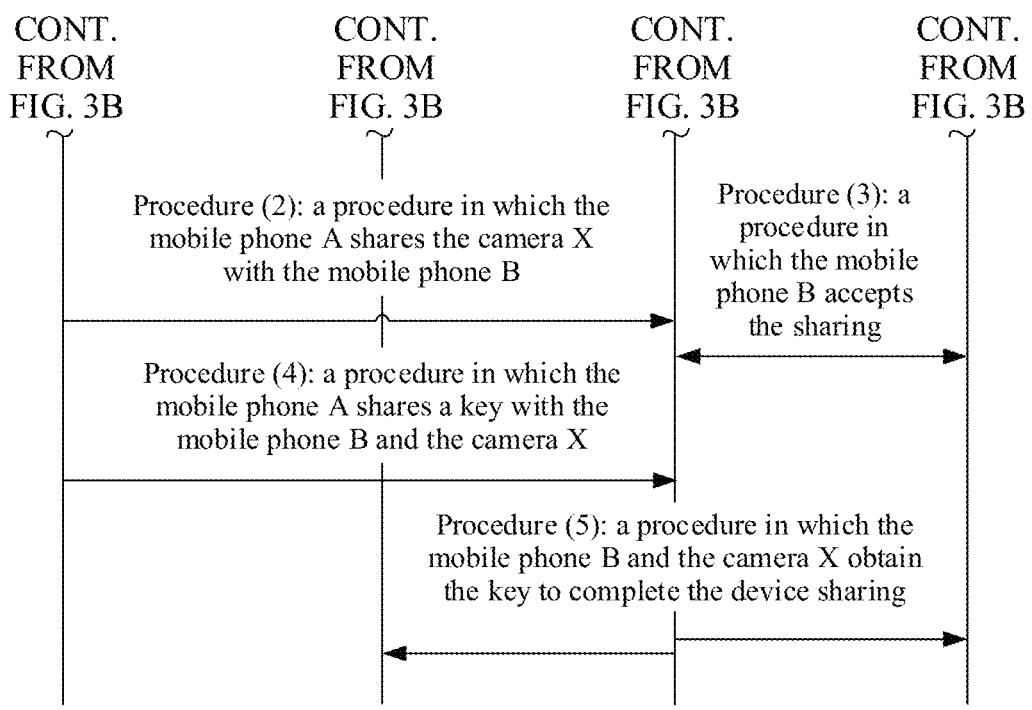

For example, as shown in FIG. 3A to FIG. 3C, the method in this embodiment of this application may include five procedures from a procedure (1) to a procedure (5): procedure (1): a procedure in which the mobile phone A is bound to the camera X, procedure (2): a procedure in which the mobile phone A shares the camera X with the mobile phone B, procedure (3): a procedure in which the mobile phone B accepts the sharing, procedure (4): a procedure in which the mobile phone A shares a key with the mobile phone B and the camera X, and procedure (5): a procedure in which the mobile phone B and the camera X obtain the key to complete the device sharing.

As shown in FIG. 3A to FIG. 3C, the procedure (1), that is, the "procedure in which the mobile phone A is bound to the camera X", may include S101 to S113.

S101: The camera X enters a binding state after being powered on, and serves as an access point (AP) in the binding state to provide a first wireless network.

It should be noted that, after a home device (for example, the camera X) is delivered from a factory and is powered on for the first time, the home device may enter the foregoing binding state. In the binding state, the home device serves as an AP to provide a wireless local area network (that is, the foregoing first wireless network). The first wireless network may be accessed by another device (for example, the mobile phone A), to bind to the home device. For example, the foregoing AP may be a Wi-Fi hotspot, and the first wireless network may be a Wi-Fi network.

S102: The mobile phone A displays a second interface of the first app, where the second interface includes an icon of the camera X.

In one embodiment, the second interface may further include a network identifier of the first wireless network provided by the camera X. For example, if the first wireless network is a Wi-Fi network, the network identifier of the first wireless network may be a service set identifier (SSID) of the first wireless network. For example, the SSID of the Wi-Fi network provided by the camera X in the binding state may be SXT-X.

Figure 4A:
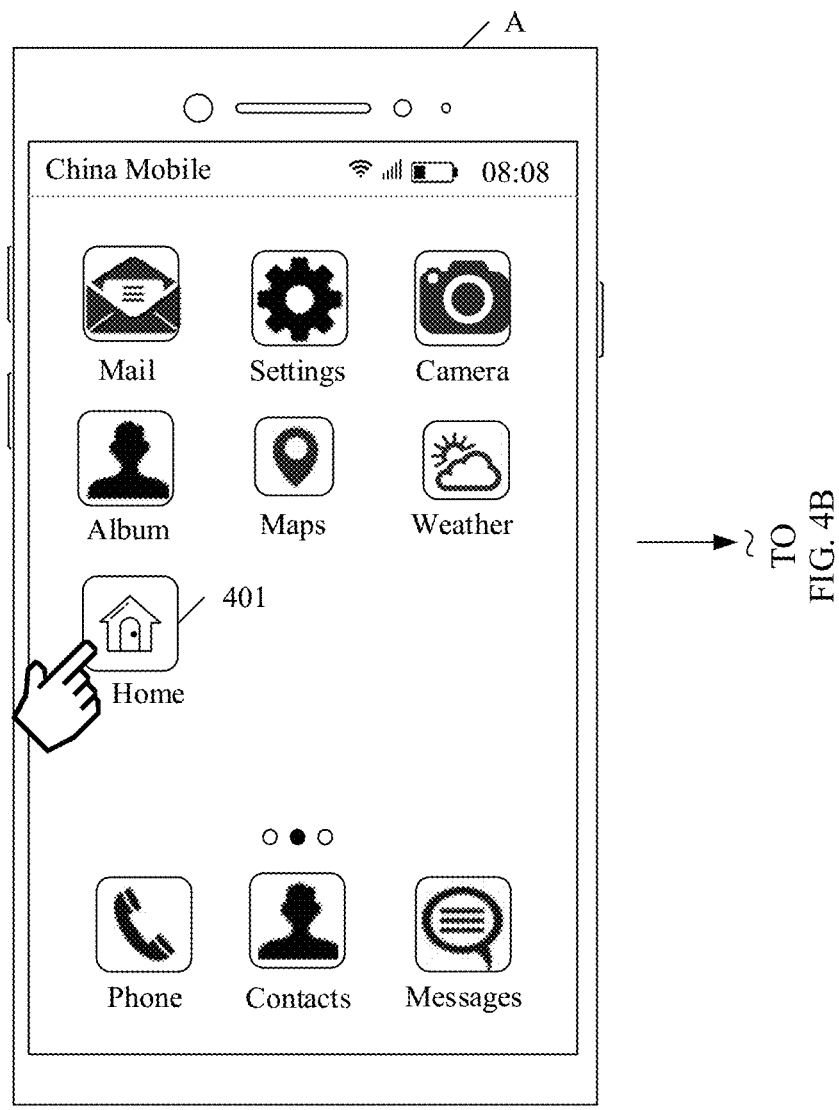
FIG. 4A to FIG. 4C are schematic diagrams of a display interface of a device according to an embodiment of this application.

For example, the first app in this embodiment of this application may be an application corresponding to an icon "Home" 401 shown in FIG. 4A. As shown in FIG. 4A, the mobile phone A may receive a tap operation performed by a user on the icon "Home" 401. In response to the tap operation, the mobile phone A may start the first app, and display a home page 402 of the first app shown in FIG. 4B. The home page 402 of the first app includes an "Add devices" option 403. The "Add devices" option 403 is used to trigger the mobile phone A to search for a wireless local area network provided by the home device, to implement binding to the home device. For example, as shown in FIG. 4B, the home page 402 of the first app further includes prompt information "Add home devices to bind smart home devices such as a light, a door lock, a camera, and a washing machine!".

Figure 4B:
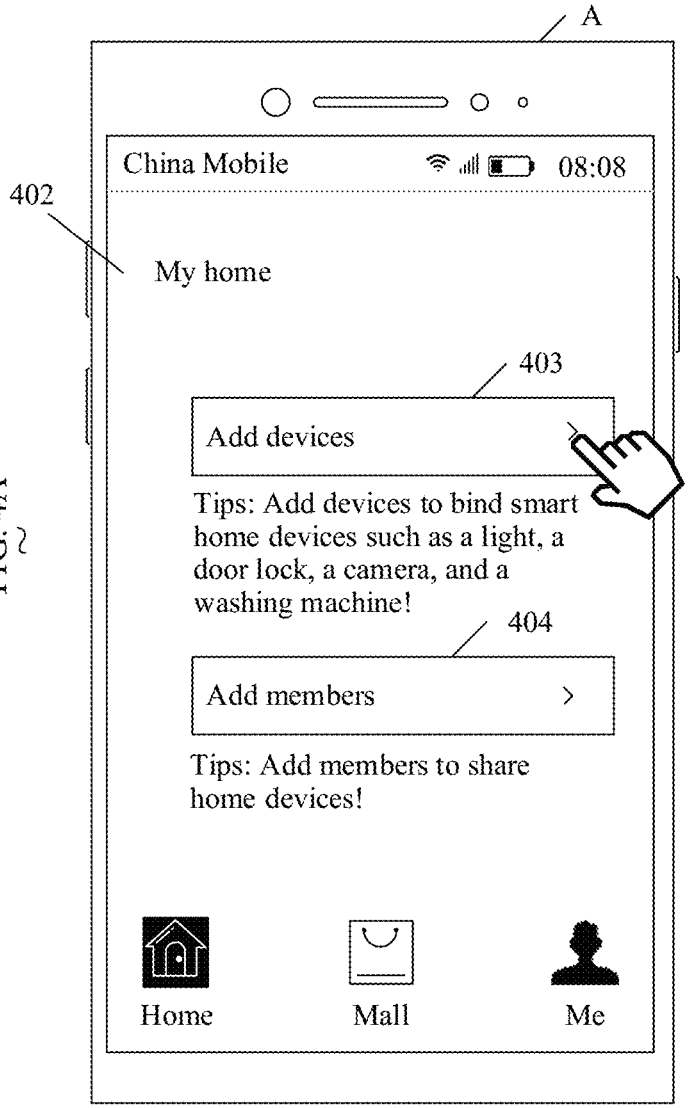
Figure 4C:
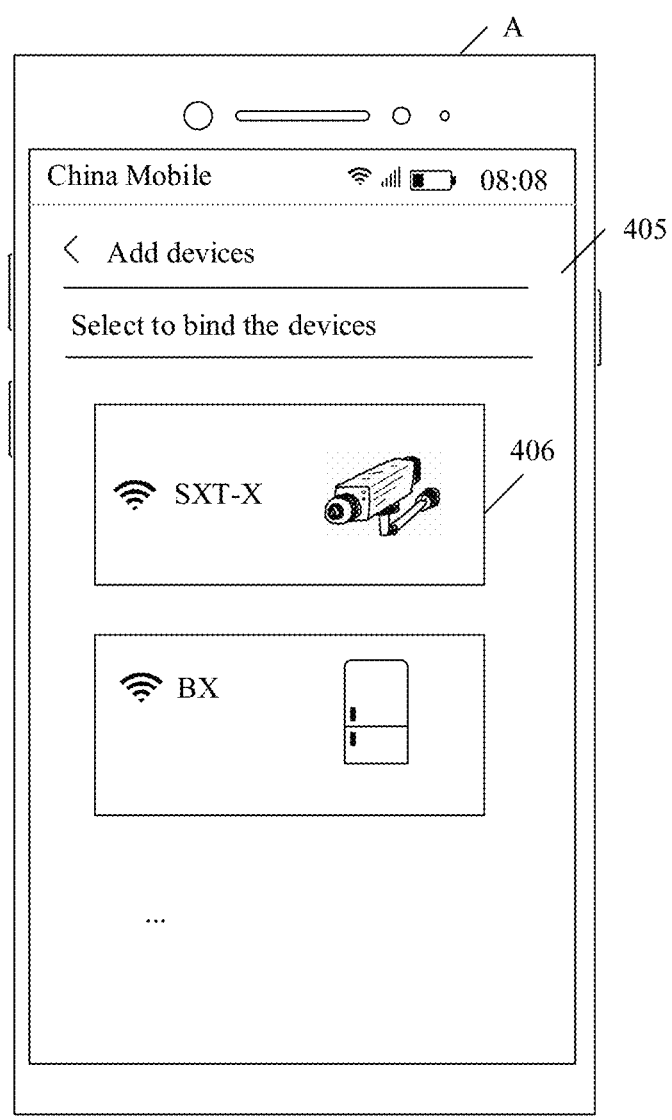

In response to a tap operation performed by the user on the "Add devices" option 403, the mobile phone A may display a second interface 405 shown in FIG. 4C. The second interface 405 may also be referred to as a device search interface or a device addition interface. The second interface 405 includes an icon of a home device that can be found by the mobile phone A, and may further include an SSID of a Wi-Fi network provided by the home device. Specifically, in response to the tap operation performed by the user on the "Add devices" option 403, the mobile phone A may search for a Wi-Fi network around the mobile phone A, and display a device search interface (that is, the second interface) including an SSID of the found Wi-Fi network.

Because the camera X serves as an AP in the binding state to provide the first wireless network whose SSID is the SXT-X, and the mobile phone A is located near the camera X when the user binds the mobile phone A to the camera X, the mobile phone A may find the first wireless network provided by the camera X, and the second interface 405 includes the icon 406 of the camera X. In one embodiment, the second interface 405 may further include the S SID (for example, the SXT-X) of the first wireless network provided by the camera X.

As shown in FIG. 4B, the home page 402 of the first app may further include an "Add members" option 404. The "Add members" option 404 is used to add a member and share a bound home device with the member. For example, as shown in FIG. 4B, the home page 402 of the first app further includes prompt information "Add members to share home devices!". For a specific manner of adding a member by tapping the "Add members" option 404 and sharing a home device with the member, refer to detailed descriptions in the following embodiment. Details are not described herein again in this embodiment of this application.

S103: In response to a selection operation performed by the user on the icon of the camera X, the mobile phone A accesses the first wireless network provided by the camera X.

For example, the mobile phone A may receive the selection operation (for example, a tap operation) performed by the user on the SXT-X 406 shown in FIG. 4C, and access the first wireless network provided by the camera X. For a specific method in which the mobile phone A accesses the first wireless network, refer to a method in which a device accesses a wireless network in the conventional technology. Details are not described herein again in this embodiment of this application.

Figure 5A:
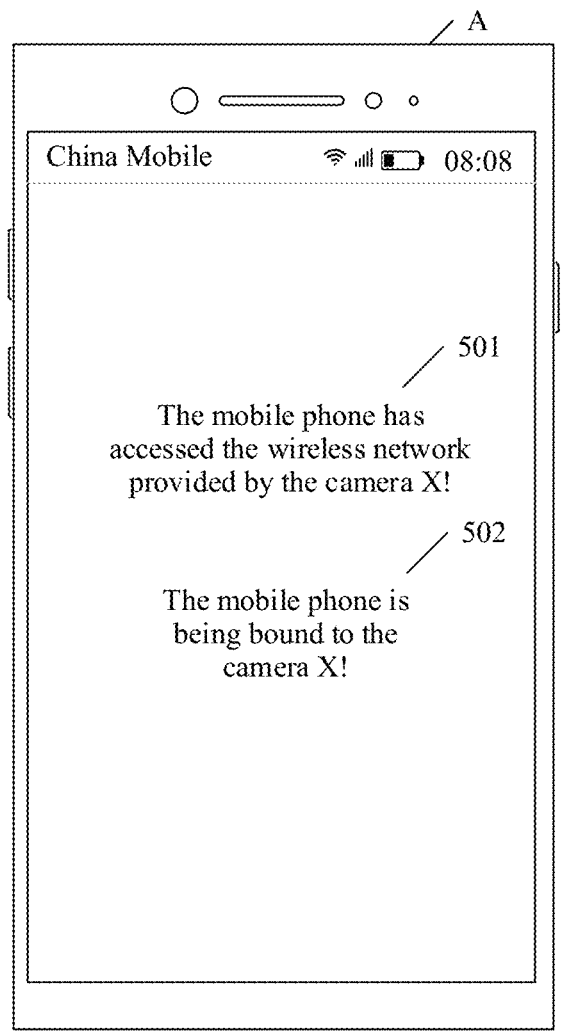
FIG. 5A is a schematic diagram of a display interface of another device according to an embodiment of this application.

In one embodiment, in some embodiments, in response to the selection operation performed by the user on the network identifier of the first wireless network, the mobile phone A may send first prompt information after the mobile phone A accesses the first wireless network. The first prompt information is used to indicate that the mobile phone A has accessed the first wireless network. For example, in response to the selection operation performed by the user on the SXT-X 406 shown in FIG. 4C, after the mobile phone A accesses the first wireless network, the mobile phone A may display first prompt information 501 "The mobile phone has accessed the wireless network provided by the camera X!" shown in FIG. 5A.

After accessing the first wireless network, the mobile phone A may perform S104 and a subsequent procedure to implement binding to the camera X. In one embodiment, the mobile phone A may further display prompt information used to prompt the user that the mobile phone is being bound to the camera X. For example, the mobile phone A may further display prompt information 502 "The mobile phone is being bound to the camera X!" shown in FIG. 5A. In some other embodiments, the mobile phone may first display the first prompt information 501. After displaying the first prompt information 501 for n seconds (n≥2, and n is a positive integer), the mobile phone does not display the first prompt information 501, but displays the prompt information 502.

S104: The mobile phone A negotiates a shared key with the camera X over the first wireless network.

The shared key is used to encrypt a message (including an online message and an offline message) between the mobile phone A and the camera X in a process in which the mobile phone A is bound to the camera X.

For example, the mobile phone A and the camera X may negotiate a shared key by using a PAKE protocol. For example, the user performs the selection operation on the SXT-X 406 shown in FIG. 4C. After the mobile phone A accesses the first wireless network, the mobile phone A may display a password input interface 503 shown in FIG. 5B. The password input interface 503 includes a password input box 504, a "Cancel" button, and an "OK" button. A password used for shared key negotiation may be entered into the password input box 504. The password may be a combination of n characters including digits, letters, and/or other characters, where n≥2. The password may be printed on a housing or an outer packing box of a home device (such as the camera X).

It is assumed that the foregoing password is a character combination "ABC789" printed on the housing of the camera X. The mobile phone A may receive the password "ABC789" entered by the user into the password input box 504 shown in FIG. 5B, receive a tap operation performed by the user on the "OK" button, and negotiate the shared key with the camera X by using the PAKE protocol.

It can be understood that the first wireless network provided by the camera X is an unencrypted wireless network and consequently is an insecure network. Therefore, in addition to the mobile phone A, another device located around the camera X may also find the first wireless network and access the first wireless network. The another device may negotiate a shared key with the camera X, to implement binding to the camera X. In this embodiment of this application, using the PAKE protocol to negotiate the shared key can prevent another device from being bound to the camera X.

Specifically, the PAKE protocol may support two devices (for example, the mobile phone A and the camera X) that share a password in performing mutual authentication and negotiate a secure session key (that is, the foregoing shared key) through communication in an insecure network. It can be understood that a user of another device cannot learn of the foregoing password, and therefore cannot negotiate the shared key with the camera X by using the PAKE protocol. Consequently, the another device cannot be bound to the camera X.

In this embodiment of this application, the mobile phone A and the camera X negotiate, by using the PAKE protocol, the shared key used to implement binding to the camera X, so that another device can be prevented from being bound to the camera X, and a user of another device can be prevented from stealing user information of the mobile phone A after the user of the another device is bound to the camera X, thereby protecting user information security.

S105: The mobile phone A generates the message leaving key Pod.

The message leaving key Pod is used to encrypt an offline message between the mobile phone A and the camera X. The mobile phone A may randomly generate the message leaving key Pod through the first app. In one embodiment, the mobile phone A may further receive a message leaving key Pod that is set by the user. In other words, the message leaving key Pod may be set by the user in the mobile phone A.

S106: The mobile phone A encrypts the message leaving key Pod, a public key of the mobile phone A, and access information of a second wireless network by using the shared key, to obtain fourth encrypted information.

The second wireless network may be a home Wi-Fi network. The access information of the second wireless network may include an SSID and a Wi-Fi password of the home Wi-Fi network. The access information of the second wireless network is used to access the second wireless network.

In this embodiment of this application, the public key of the mobile phone A is a public key of the first account used to log in to the first app on the mobile phone A, and a private key of the mobile phone A is a private key of the first account used to log in to the first app on the mobile phone A.

S107: The mobile phone A sends the fourth encrypted information to the camera X over the first wireless network.

It can be understood that the shared key is a key negotiated by the mobile phone A and the camera X. Therefore, only the mobile phone A and the camera X learn of the shared key, and another device cannot learn of the shared key. Consequently, the fourth encrypted information cannot be decrypted to obtain the message leaving key Pod, the public key of the mobile phone A, and the access information of the second wireless network, so that user information security can be protected.

For example, the message leaving key Pod is used to encrypt the offline message between the mobile phone A and the camera X. The offline message between the mobile phone A and the camera X is forwarded through the server 100. However, the server 100 cannot learn of the shared key. Therefore, the fourth encrypted information cannot be decrypted to obtain the message leaving key Pod, so that the offline message between the mobile phone A and the camera X cannot be decrypted, thereby protecting user information security.

S108: The camera X receives the fourth encrypted information over the first wireless network, and decrypts the fourth encrypted information by using the shared key, to obtain the message leaving key Pod, the public key of the mobile phone A, and the access information of the second wireless network.

S109: The camera X accesses the second wireless network based on the access information of the second wireless network.

For a specific method in which the camera X accesses the second wireless network based on the access information of the second wireless network, refer to a method in which a device accesses a Wi-Fi network based on an SSID and a Wi-Fi password of the Wi-Fi network in the conventional technology. Details are not described herein again in this embodiment of this application.

In some embodiments, after S104, the camera X may also share a public key of the camera X with the mobile phone A. Specifically, as shown in FIG. 3A to FIG. 3C, after S104, the method in this embodiment of this application may further include S110 to S112.

S110: The camera X encrypts the public key of the camera X by using the shared key, to obtain third encrypted information.

S111: The camera X sends the third encrypted information to the mobile phone A over the first wireless network.

S112: The mobile phone A receives the third encrypted information over the first wireless network, and decrypts the third encrypted information by using the shared key, to obtain the public key of the camera X.

The public key and a private key of the camera X may be set before the camera X is delivered from a factory, or may be generated (for example, randomly generated) when the camera X is powered on for the first time after the camera X is delivered from a factory.

The private key of the camera X is used to digitally sign an online message sent by the camera X. The public key of the camera X is used by another device (for example, the mobile phone A or the mobile phone B) to perform signature verification on an online message from the camera X.

In other words, all online messages sent by the camera X to the mobile phone A are digitally signed by using the private key of the camera X. After obtaining the public key of the camera X, the mobile phone A may perform signature verification on the online message from the camera X by using the public key of the camera X, to determine whether the online message is tampered with.

To prevent the camera X from being bound to a plurality of devices, after S111, the method in this embodiment of this application may further include S113.

S113: The camera X exits the foregoing binding state.

It can be understood that, after the camera X exits the foregoing binding state, the camera X no longer serves as an AP to provide the first wireless network. In addition, the camera X does not enter the binding state again after the camera X exits the binding state. That the camera X is bound to the mobile phone A in this embodiment of this application means that the camera X and the mobile phone A exchange the respective public keys, and determine the message leaving key Pod.

In other words, the camera X may enter the binding state when the camera X is powered on for the first time, and the camera X may exit the binding state after the camera X is bound in the binding state. In addition, the camera X does not enter the binding state again after the camera X exits the binding state. Even if the camera X is powered off and then powered on, the camera X may not enter the binding state.

Certainly, if the camera X is not bound to any device after the camera X is powered on for the first time, the camera X still enters the binding state after the camera X is powered off and then powered on again.

In some other embodiments, S110 to S113 may not be performed after S104. Instead, after S109 (that is, after the camera X accesses the second wireless network), the camera X performs S110 to obtain the third encrypted information, and then the camera X may send the third encrypted information to the mobile phone A over the second wireless network. The mobile phone A receives the third encrypted information over the second wireless network, and decrypts the third encrypted information by using the shared key, to obtain the public key of the camera X.

In this embodiment, the camera X may exit the binding state after sending the third encrypted information to the mobile phone A over the second wireless network.

In some embodiments, the mobile phone A may send second prompt information after the mobile phone A is bound to the camera X (that is, after the camera X is bound to the mobile phone A). The second prompt information is used to indicate that the mobile phone A has been bound to the camera X, to be specific, the mobile phone A has obtained control of the camera X and can control the camera X. For example, after the mobile phone A obtains the public key of the camera X by decrypting the third encrypted information by using the shared key (in other words, after S112), the method in this embodiment of this application may further include: The mobile phone A sends the second prompt information.

Figure 5B:
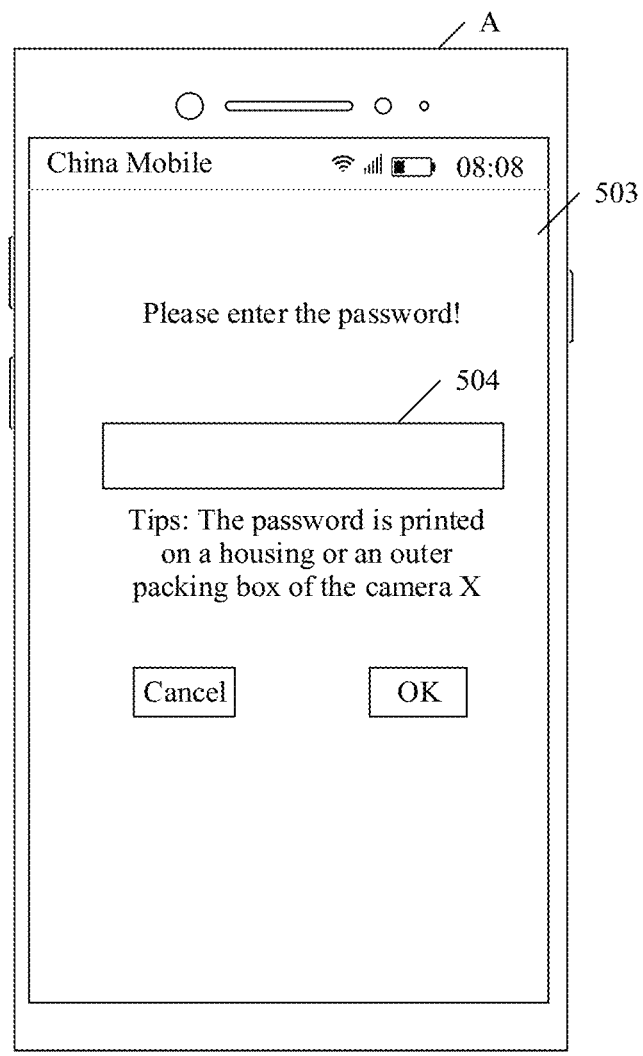
FIG. 5B is a schematic diagram of a display interface of another device according to an embodiment of this application.
Figure 5C:
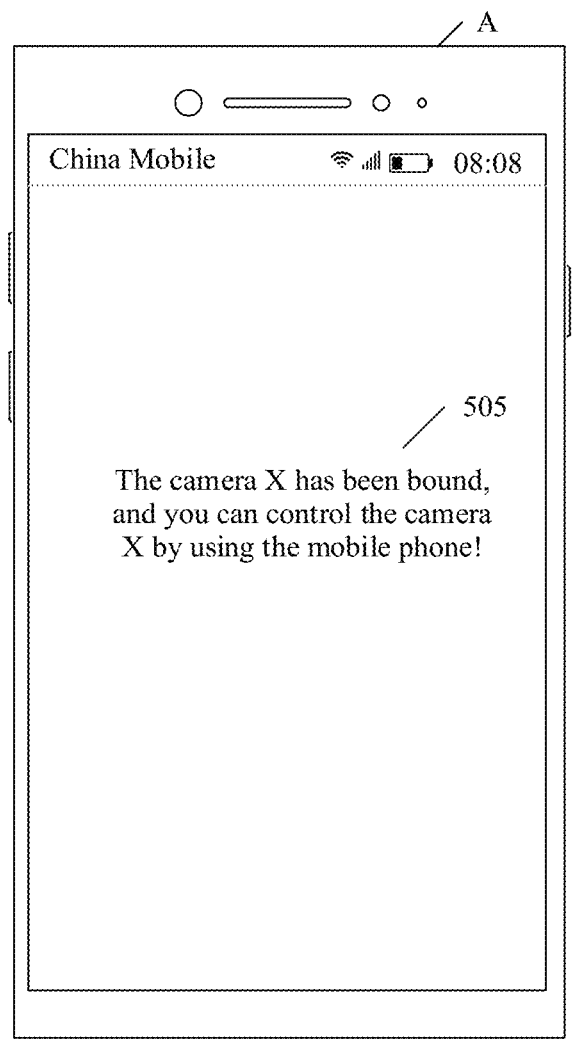
FIG. 5C is a schematic diagram of a display interface of another device according to an embodiment of this application.

For example, in response to that the user enters a password into the password input box 504 shown in FIG. 5B and taps the "OK" button, after the mobile phone A is bound to the camera X, the mobile phone A may display second prompt information 505 "The camera X has been bound, and you can control the camera X by using the mobile phone!" shown in FIG. 5C. Alternatively, in response to the selection operation performed by the user on the SXT-X 406 shown in FIG. 4C, the mobile phone A may display the first prompt information 501 shown in FIG. 5A after accessing the first wireless network. Then, the mobile phone A may display the second prompt information 505 shown in FIG. 5C after the mobile phone A is bound to the camera X.

Figures 1, 5D:
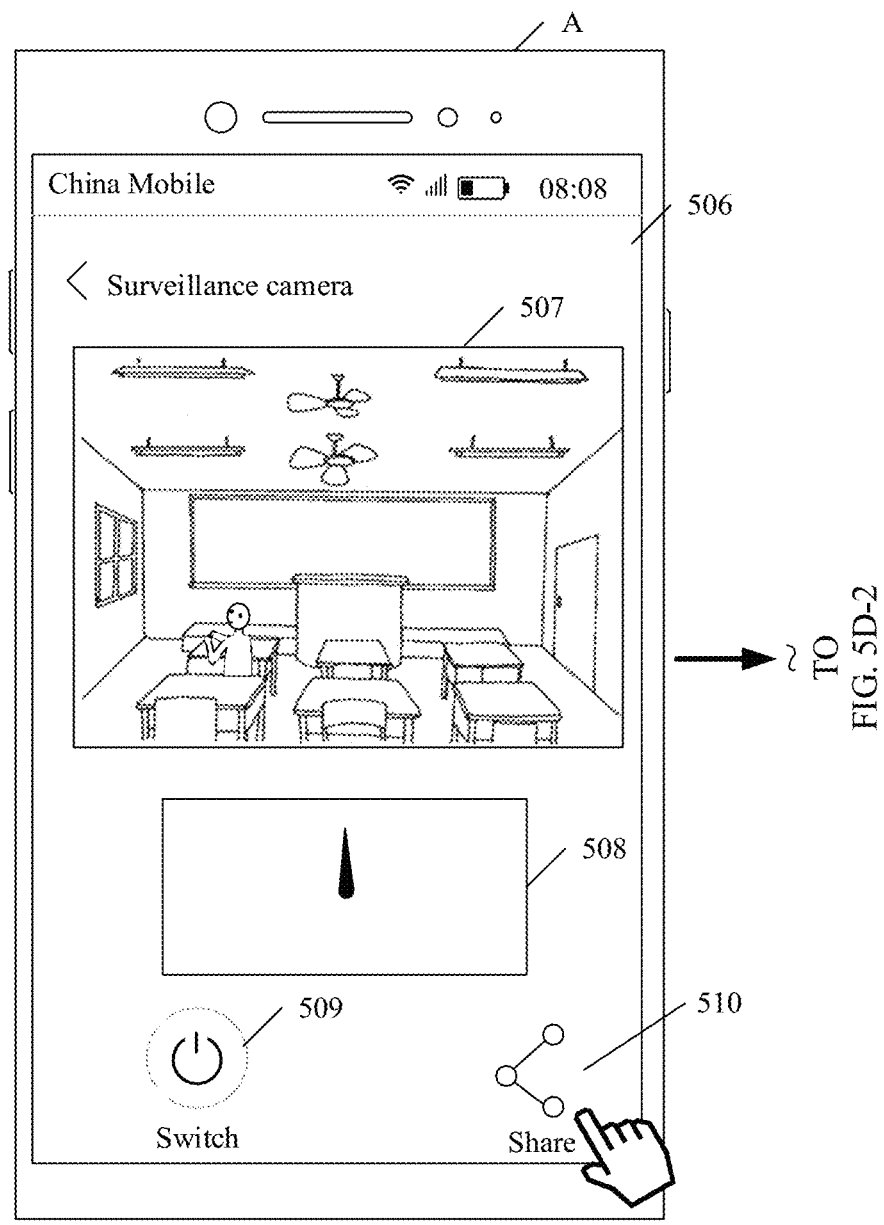

In some other embodiments, after the mobile phone A is bound to the camera X, the mobile phone A may display a device management interface 506 of the camera X shown in FIG. 5D-1. Alternatively, after displaying the second prompt information 505, the mobile phone A may display the device management interface 506 of the camera X shown in FIG. 5D-1. The device management interface 506 may include a viewfinder screen 507 of the camera X, an adjustment and control area 508 of the camera X, a switch 509 of the camera X, and a "Share" button 510. The viewfinder screen 507 is used to display an image captured by the camera X. The mobile phone A may receive an adjustment operation entered by the user into the adjustment and control area 508, and adjust each parameter (for example, a shooting angle and an exposure rate) of the camera X. The switch 509 is used to control enable and disable of the camera X. The "Share" button 510 is used to trigger the mobile phone A to share the camera X with another device.

In this embodiment of this application, in a process in which the mobile phone A is bound to the camera X, the mobile phone A may generate the message leaving key Pod used to encrypt the offline message between the mobile phone A and the camera X, and indicate the message leaving key Pod to the camera X in an encryption manner. In this way, even if either the mobile phone A or the camera X is in an offline state, and the other is in an online state, an offline message may be encrypted by using the message leaving key Pod, to implement offline communication between the mobile phone A and the camera X.

In this way, in a process in which the mobile phone A shares the camera X with the mobile phone B, the mobile phone A may perform offline communication with the camera X, to support offline sharing of the offline camera X.

Figures 2, 3, 5D:
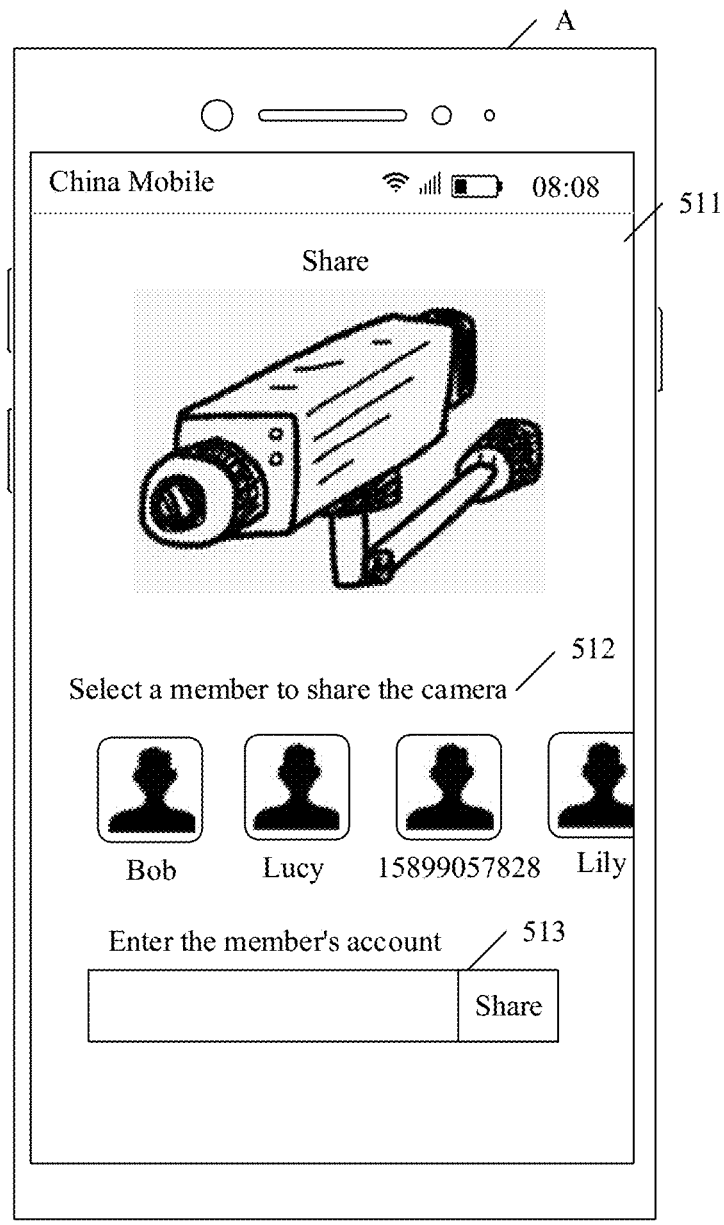
Figures 3, 5D:
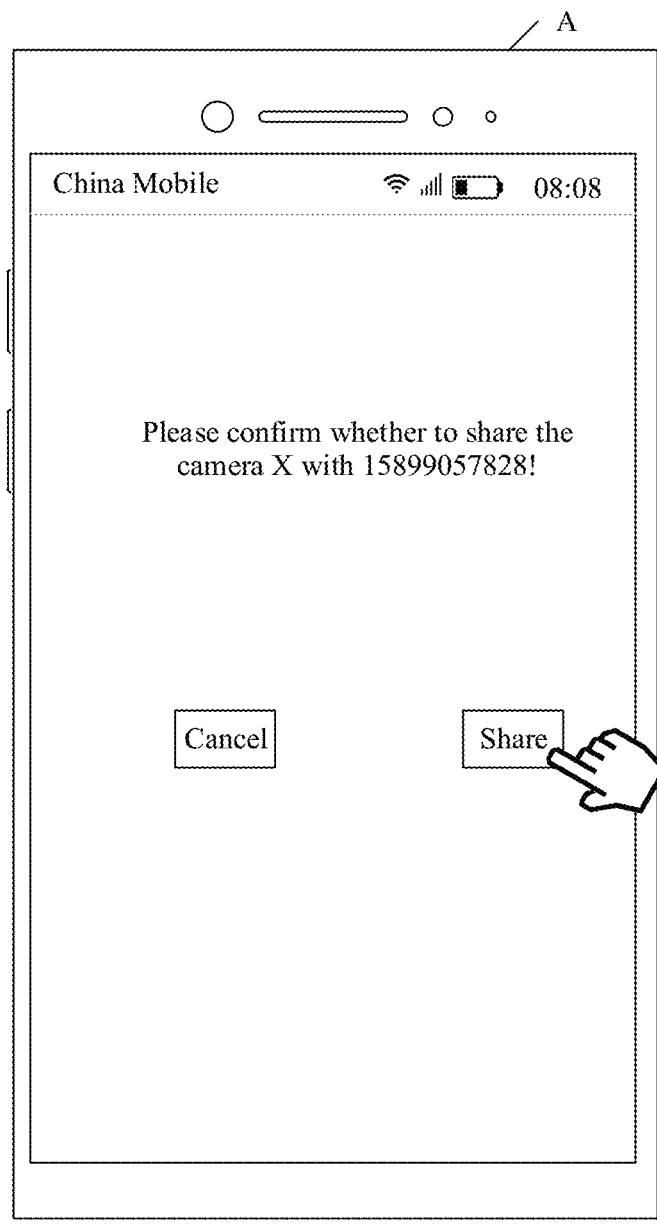
Figures 1, 6A:
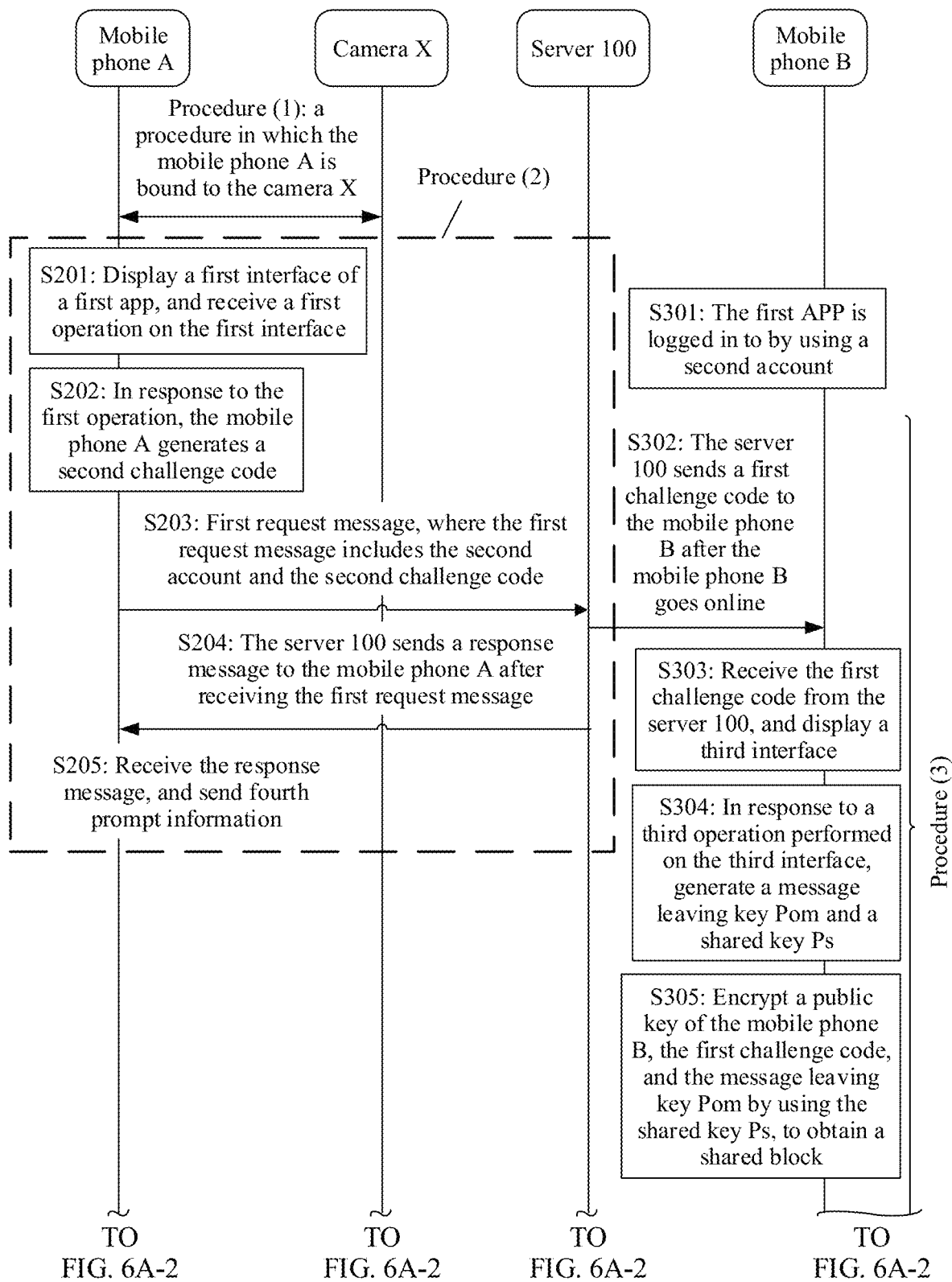
Figures 2, 6A:
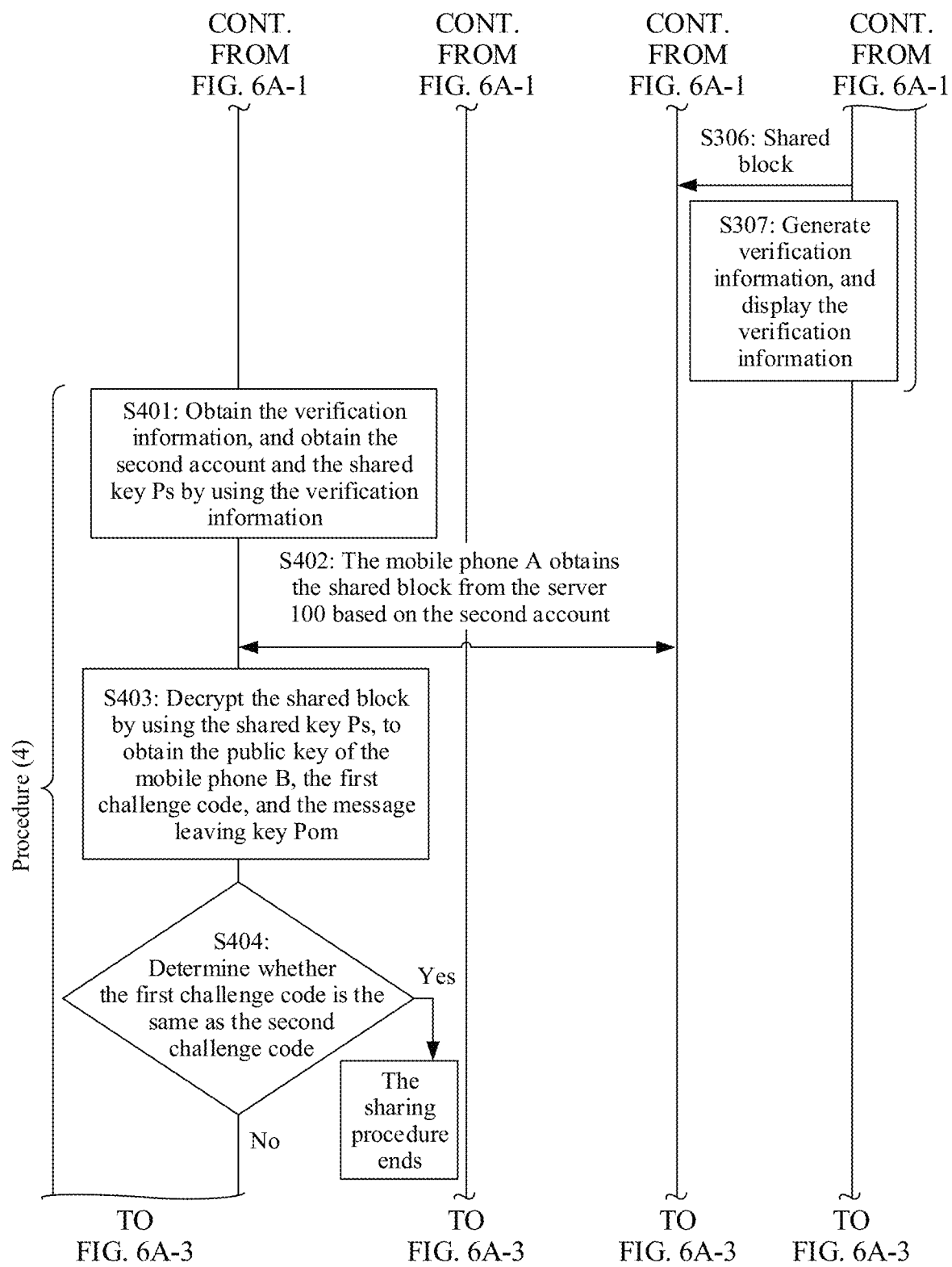
Figures 3, 6A:
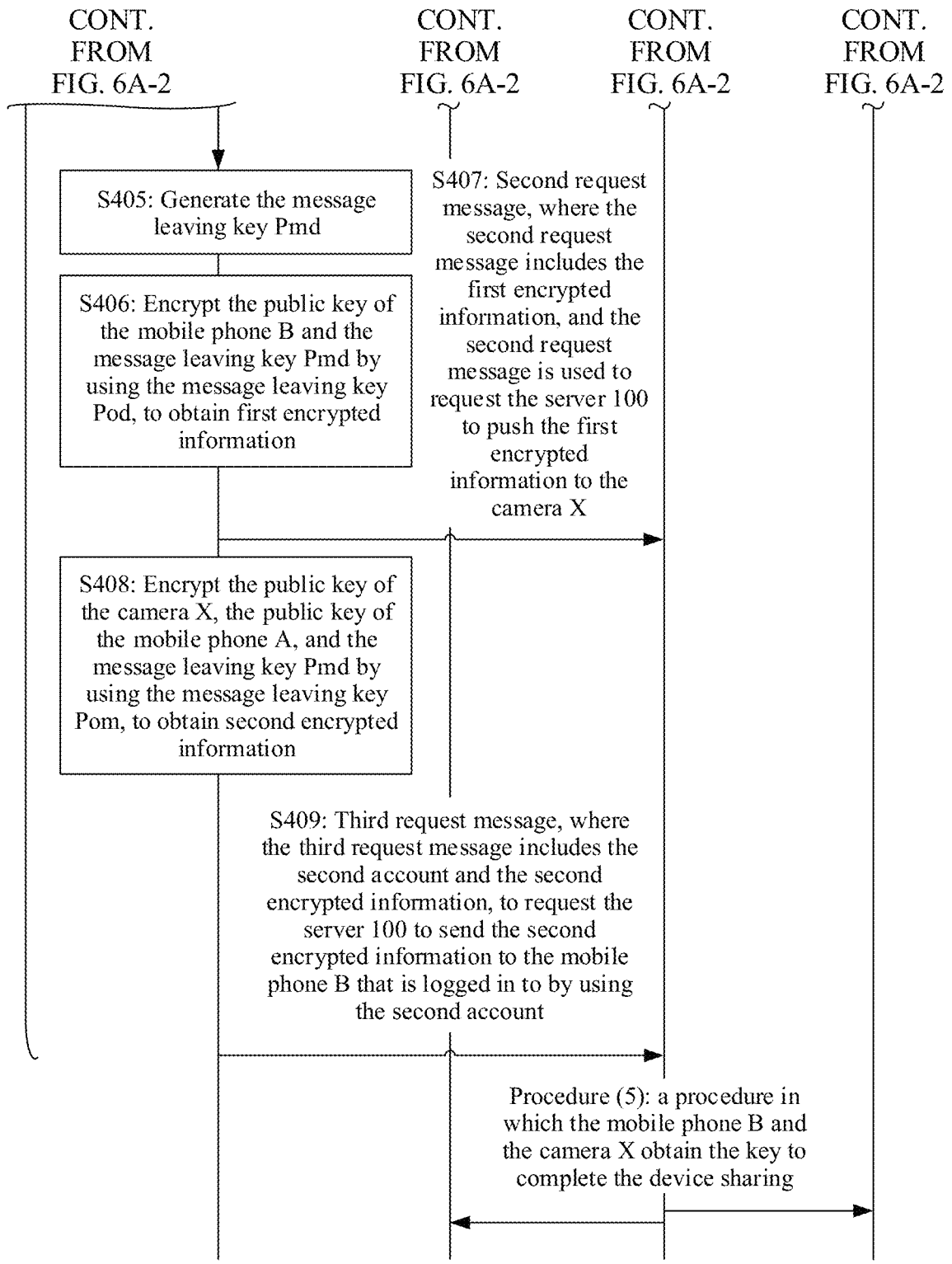

It can be understood that the mobile phone A may share the camera X with another device (for example, the mobile phone B) after the mobile phone A is bound to the camera X. As shown in FIG. 6A-1 to FIG. 6A-3, the procedure (2), that is, the procedure in which the mobile phone A shares the camera X with the mobile phone B, may include S201 to S205.

S201: The mobile phone A displays a first interface of the first app, and receives a first operation on the first interface.

The first operation is used to trigger the mobile phone A to share the camera X with the second account.

The following describes the first interface and the first operation in detail by using an implementation (1) and an implementation (2).

In the implementation (1), the first interface may be a device sharing interface of the camera X. The device sharing interface of the camera X includes icons of a plurality of accounts (including the second account). For example, the first interface may be a device sharing interface 511 shown in FIG. 5D-2. The device sharing interface 511 includes icons 512 of a plurality of accounts. An icon of an account may display the account, a remark name of the account, or a nickname of the account. For example, in FIG. 5D-2, nicknames of corresponding accounts are displayed on an icon of Bob, an icon of Lucy, and an icon of Lily, and a corresponding account "15899057828" is displayed on an icon of 15899057828.

The first operation may be a tap operation performed by the user on an icon of the second account. For example, assuming that the second account is 15899057828, the first operation may be a tap operation (for example, a one-tap operation) performed by the user on the icon of 15899057828 shown in FIG. 5D-2, or the first operation may include a tap operation performed by the user on an "account" input box 513 shown in FIG. 5D-2 and a tap operation performed by the user on a "Share" button in the "account" input box 513.

The mobile phone A may display a device management interface of a to-be-shared home device, for example, the device management interface 506 of the camera X shown in FIG. 5D-1. In response to the tap operation (for example, the one-tap operation) performed by the user on the "Share" button 510 on the device management interface 506, the mobile phone A may display the first interface 511.

In the implementation (2), the first interface may be a device sharing interface of the second account among members (that is, friends) of the first account. The device sharing interface of the second account includes identifiers of a plurality of home devices (including the camera X) bound to the first account (that is, the mobile phone A that is logged in to by using the first account). For example, the first interface may be a device sharing interface 516 shown in FIG. 5E-2. The device sharing interface 516 includes an identifier of an air conditioner, an identifier 517 of the camera X, an identifier of a refrigerator, and the like.

The first operation may be a tap operation performed by the user on the identifier of the camera X. For example, the first operation may be a tap operation (for example, a one-tap operation) performed by the user on the identifier 517 of the camera X.

Figures 1, 2, 5E:
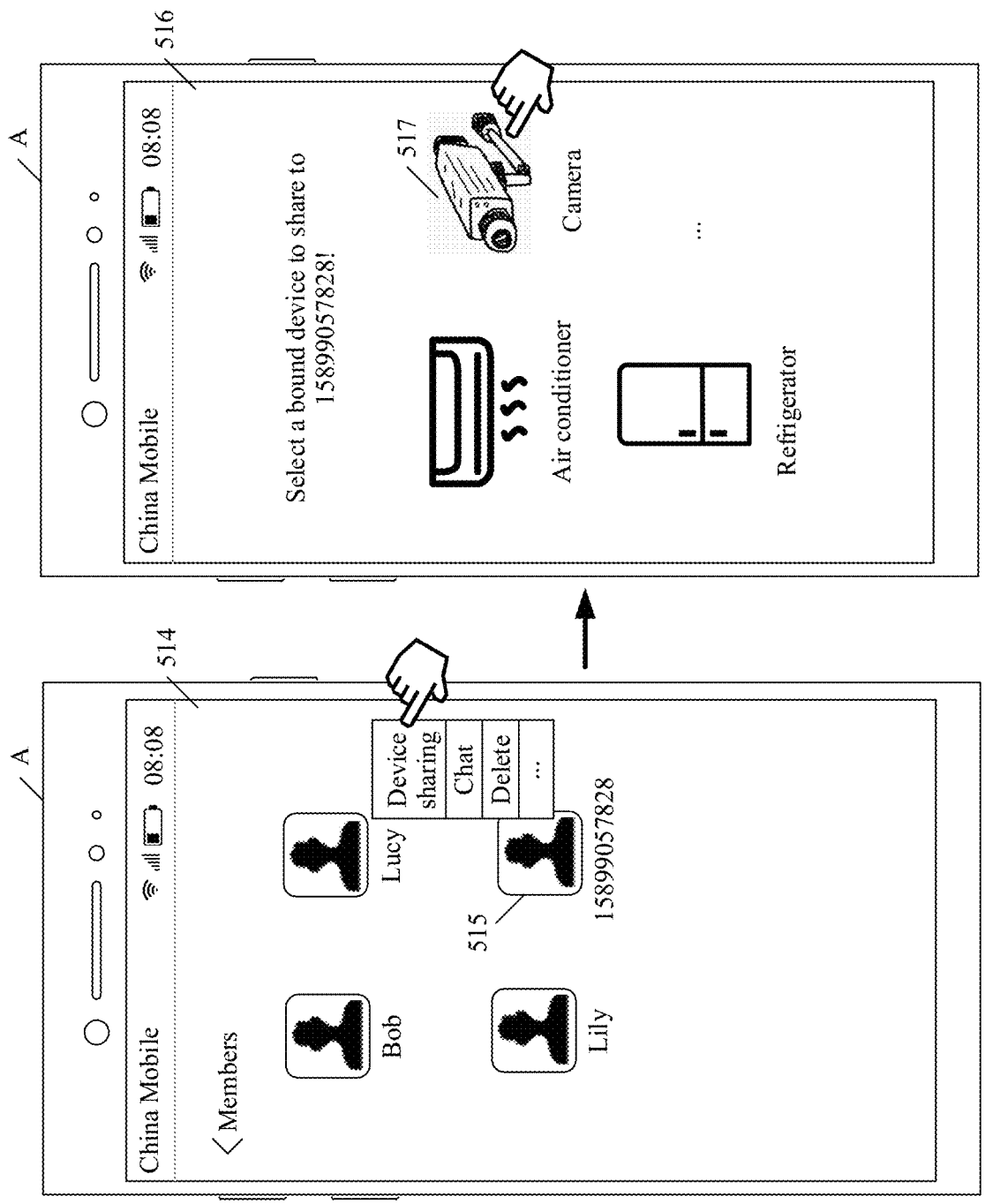

The mobile phone A displays a member management interface 514 shown in FIG. 5E-1, and the member management interface 514 may include icons of a plurality of accounts. Each account corresponds to one member (that is, a friend) of the first account. An icon of an account may display the account, a remark name of the account, or a nickname of the account. For example, an account 15899057828 is displayed on an icon 515. In response to a second operation (for example, a touch and hold operation or a double-tap operation) performed on the icon 515 of the second account (for example, 15899057828), the mobile phone A may display an edit box shown in FIG. 5E-1, where the edit box includes a "Device sharing" option, a "Chat" option, a "Delete" option, and the like. The "Device sharing" option is used to trigger the mobile phone A to share a home device with the account corresponding to the icon 515. In response to the tap operation (for example, the one-tap operation) performed by the user on the icon 515, the mobile phone A may display the device sharing interface 516 shown in FIG. 5E-2, that is, the first interface.

The "Chat" option is used to trigger the mobile phone A to display a chat window of the account corresponding to the icon 515 in the first app. The "Delete" option is used to trigger the mobile phone A to delete the second account from the friends or members of the first account.

In response to the first operation, the mobile phone A may send a first request message to the server 110. The first request message is used to request the server 100 to indicate the mobile phone B to generate verification information and upload a shared block to the server 100. The verification information and the shared block are described in detail in the following embodiments. Details are not described herein again in this embodiment of this application.

For example, the mobile phone A may request, in a manner shown in S202 and S203, the server 100 to indicate the mobile phone B to generate the verification information and upload the shared block to the server 100.

S202: In response to the first operation, the mobile phone A generates a second challenge code.

For example, the second challenge code may be an m-digit random number, where m≥6. For example, m=32 or m=16. It can be understood that, because the first operation is used to trigger the mobile phone A to share the camera X with the second account, the second challenge code generated in response to the first operation is generated for the second account. The mobile phone A may generate different challenge codes for different accounts. The mobile phone A may store a correspondence between the second account and the second challenge code.

In one embodiment, in response to the first operation performed by the user on the first interface, the mobile phone A may further display third prompt information. The third prompt information is used to prompt the user to confirm sharing of the camera X with the second account. For example, the mobile phone A may display third prompt information "Please confirm whether to share the camera X with 15889057828!" shown in FIG. 5D-3. In response to a tap operation performed by the user on a "Share" button shown in FIG. 5D-3, the mobile phone may generate the second challenge code.

S203: The mobile phone A sends the first request message to the server 100, where the first request message includes the second account and the second challenge code.

The first request message is used to request the server 100 to push the second challenge code to the mobile phone B that is logged in to by using the second account, to indicate the mobile phone B to generate the verification information and upload the shared block to the server 100.

S204: The server 100 sends a response message to the mobile phone A after receiving the first request message.

The mobile phone A may access the second wireless network. The mobile phone A may send the first request message to the server 100 over the second wireless network, and receive the response message from the server 100 over the second wireless network. Alternatively, the mobile phone A may send the first request message to the server 100 over a mobile communications network of the mobile phone A, and receive the response message from the server 100 over the mobile communications network.

S205: The mobile phone A sends fourth prompt information after receiving the response message.

The fourth prompt information is used to prompt the user that the camera X has been shared with the second account.

Figures 2, 6B:
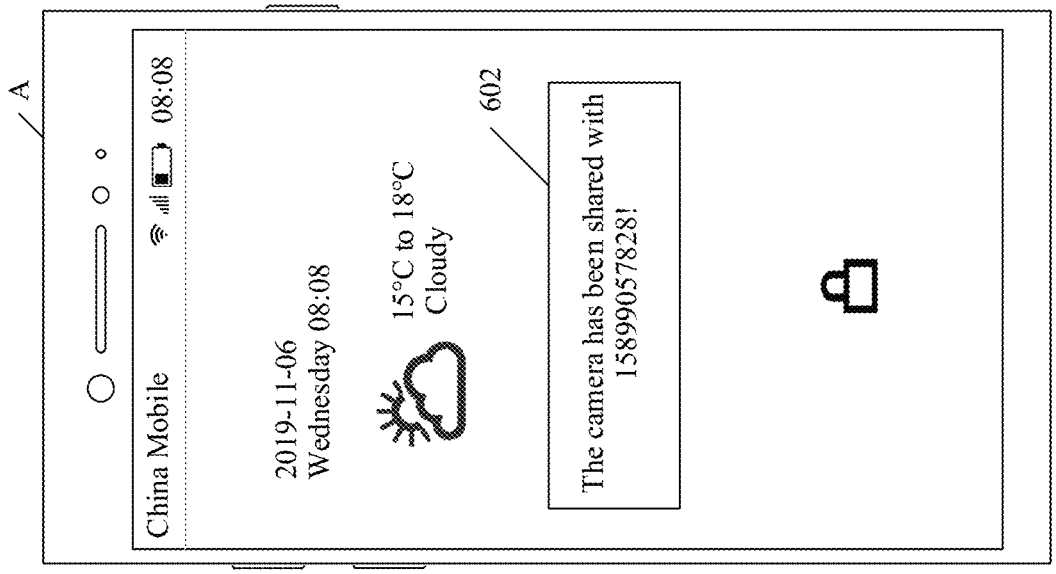
Figures 1, 6B:
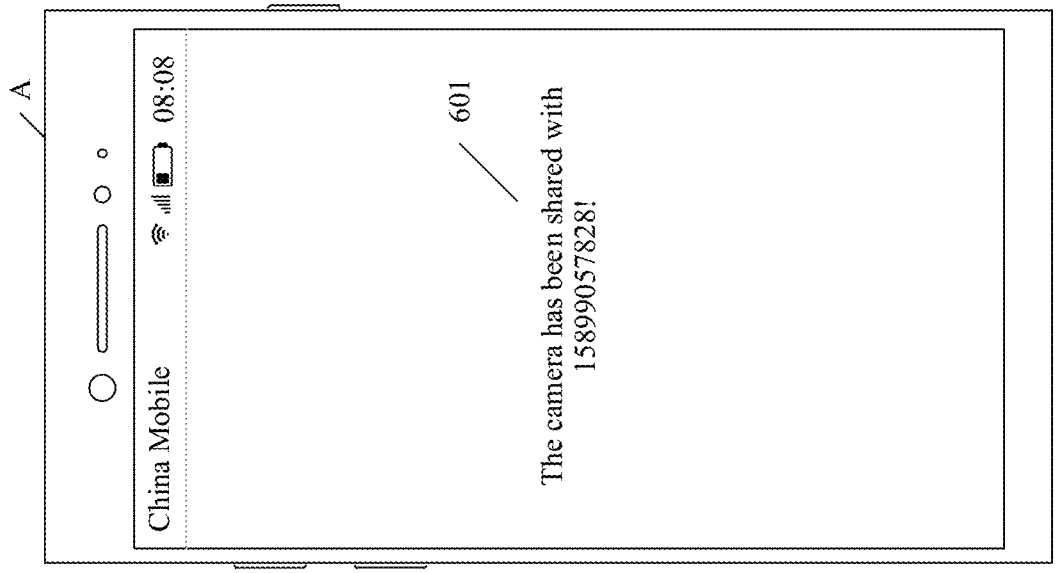

For example, after S201, the mobile phone A may perform S202 and S203 after receiving the first operation (for example, a tap operation performed by the user on the identifier 517 of the camera X shown in FIG. 5E-2). Then, after receiving the response message from the server 100, the mobile phone A may display fourth prompt information 601 "The camera has been shared with 15899057828!" shown in FIG. 6B-1.

In some scenarios, after entering the first operation on the first interface to trigger the mobile phone A to share the camera X with the second account, the user may operate the mobile phone A to display another interface. For example, after receiving the first operation, the mobile phone A may receive a lock screen operation and display a lock screen interface. In this scenario, regardless of an interface displayed by the mobile phone A, the mobile phone A can display the fourth prompt information provided that the mobile phone A receives the response message. For example, the mobile phone A may display the fourth prompt information by using a notification message. For example, the mobile phone A may display fourth prompt information 602 "The camera has been shared with 15899057828!" on a lock screen interface shown in FIG. 6B-2.

In this embodiment of this application, in response to the first operation performed by the user on the first interface, the mobile phone A may request the server 100 to push the second challenge code to the second account (that is, the mobile phone B that is logged in to by using the second account). In this way, if the mobile phone B is in an online state, the server 100 may directly send the second challenge code to the mobile phone B, to perform online sharing of the camera X. If the mobile phone B is in an offline state, the server 100 may send the second challenge code to the mobile phone B after the mobile phone B goes online, to perform offline sharing of the camera X. Specifically, after the procedure (2), the method in this embodiment of this application may further include the procedure (3):

As shown in FIG. 6A-1 to FIG. 6A-3, the procedure (3), that is, the procedure in which the mobile phone B accepts the sharing, may include S301 to S307.

S301: The first app on the mobile phone B is logged in to by using the second account.

The mobile phone B may display a login interface of the first app, receive the second account and a login password of the second account that are entered by the user on the login interface, and perform login by using the second account. Alternatively, if the first app on the mobile phone B has been logged in to by using the second account, and the second account and the login password of the second account are stored, in response to a start operation performed by the user on the first app, login is automatically performed by using the second account.

S302: The server 100 sends a first challenge code to the mobile phone B after the mobile phone B goes online.

That the mobile phone B goes online means that the first app on the mobile phone B is logged in to by using the second account.

Generally, if the server 100 does not tamper with the second challenge code from the mobile phone A, the first challenge code is the same as the second challenge code. After the first app on the mobile phone B is logged in to by using the second account, it indicates that the mobile phone B goes online, which may also be referred to as that the second account goes online. After detecting that the mobile phone B goes online, the server 100 may send, based on the second account in the first request message, the first challenge code (that is, the second challenge code in the first request message) to the mobile phone B that is logged in to by using the second account.

However, if the server 100 tampers with the second challenge code from the mobile phone A, the first challenge code is different from the second challenge code. The server 100 may tamper with the second challenge code from the mobile phone A, and send a tampered first challenge code to the mobile phone B that is logged in to by using the second account. The server 100 may further tamper with a sharing-receiving account. For example, the server 100 may send the second challenge code to another account different from the second account.

To prevent the server 100 from tampering with a challenge code or an account, after obtaining the first challenge code, the mobile phone A may determine whether the first challenge code is the second challenge code generated by the mobile phone A for the second account. For a method in which the mobile phone A determines whether a challenge code is tampered with, refer to detailed descriptions in the following procedure (4). Details are not described herein again in this embodiment of this application.

S303: The mobile phone B receives the first challenge code from the server 100, and displays a third interface, where the third interface is used to request the user to confirm whether to accept the camera X shared by the mobile phone A.

Figure 7:
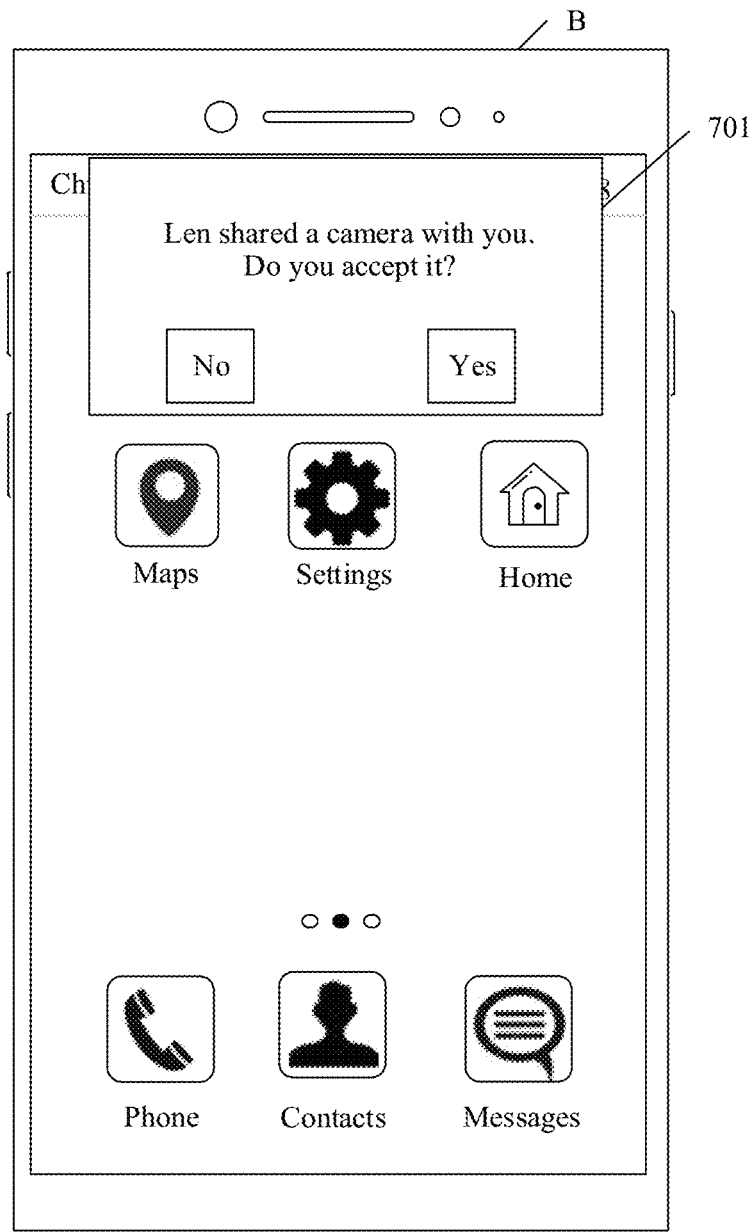
FIG. 7 is a schematic diagram of a display interface of another device according to an embodiment of this application.

It can be understood that, when the mobile phone B receives the first challenge code, the mobile phone B may display an interface of the first app, or may display any one of an interface of another application, the lock screen interface, or a home screen of the mobile phone. For example, the mobile phone B displays the home screen. With reference to the foregoing example, it is assumed that the first account is 168975abc12, and a nickname of the first account is Len (Len). As shown in FIG. 7, the mobile phone B may display prompt information 701 "Len has shared a camera with you. Do you accept it?", a "Yes" button, and a "No" button on the home screen in a form of a notification message.

S304: In response to a third operation performed by the user on the third interface, the mobile phone B generates a message leaving key Pom and a shared key Ps.

The third operation is used to indicate that the user accepts a camera (that is, the camera X) shared by Len. For example, the third operation may be a tap operation (for example, a one-tap operation) performed by the user on the "Yes" button. The method in this embodiment of this application may further include: In response to a fourth operation performed by the user on the third interface, the mobile phone B exits the third interface. The fourth operation is used to indicate that the user does not accept the camera (that is, the camera X) shared by Len. For example, the fourth operation may be a tap operation (for example, a one-tap operation) performed by the user on the "No" button.

The message leaving key Pom is used to encrypt an offline message between the mobile phone B and the mobile phone A. The shared key Ps is used to decrypt a shared block generated by the mobile phone B. The shared block is obtained through encryption by using the shared key Ps. For example, the mobile phone B may randomly generate the message leaving key Pom and the shared key Ps through the first app. Specific content of the shared block is described in S306.

S305: The mobile phone B encrypts a public key of the mobile phone B, the first challenge code, and the message leaving key Pom by using the shared key Ps, to obtain a shared block.

The public key of the mobile phone B is a public key of the second account used for login of the first app on the mobile phone B, and a private key of the mobile phone B is a private key of the second account used for login of the first app on the mobile phone B. The private key of the mobile phone B is used to digitally sign an online message sent by the mobile phone B. The public key of the mobile phone B is used by another device (for example, the mobile phone A) to perform signature verification on an online message from the mobile phone B, to determine whether the online message is tampered with.

S306: The mobile phone B sends the shared block to the server 100.

It can be understood that, because the shared key Ps is generated by the mobile phone B and the server 100 cannot learn of the shared key Ps, the server 100 cannot decrypt the shared block. In this case, the server 100 cannot learn of the public key of the mobile phone B, the first challenge code, and the message leaving key Pom. The server 100 cannot learn of the message leaving key Pom, and therefore cannot decrypt the offline message between the mobile phone B and the mobile phone A. In this way, user information security can be protected.

It should be noted that the shared block in this embodiment of this application is valid only once. Specifically, after generating the shared block and sending the shared block to the server 100, the mobile phone B may automatically delete the shared block. The server 100 may also automatically delete the shared block after any electronic device (for example, the mobile phone A) obtains (for example, downloads) the shared block from the server 100.

In addition, only a device that is logged in to by using a specified account (for example, the first account) can download the shared block from the server 100. For example, the mobile phone B may further indicate, to the server 100, an account (for example, the first account) that can be used to download the shared block. In this way, the server 100 determines whether the account that requests to download the shared block is the first account indicated by the mobile phone B. If the account that requests to download the shared block is the first account, the server 100 sends the shared block to the device that is logged in to by using the first account. If the account that requests to download the shared block is not the first account, the server 100 does not send the shared block to the device that is logged in to by using the account (that is, the account that requests to download the shared block). In one embodiment, if the account that requests to download the shared block is not the first account, the server 100 may further automatically delete the shared block.

S307: The mobile phone B generates verification information, and displays the verification information, where the verification information includes the second account and the shared key Ps.

For example, the verification information may be displayed in an image form or a digital form. The image form may include any one of the following forms: a two-dimensional code, a bar code, an electronic label, and the like. The digital form may be an electronic serial number and the like. This is not specifically limited in this embodiment of the present disclosure.

Figure 8:
FIG. 8 is a schematic diagram of a display interface of another device according to an embodiment of this application.

For example, the verification information is a two-dimensional code. With reference to the foregoing example, in response to the tap operation performed by the user on the "Yes" button, the mobile phone B may display a two-dimensional code shown in FIG. 8. The second account and the shared key Ps may be obtained by scanning the two-dimensional code. As shown in FIG. 8, the mobile phone B may further display prompt information "Please provide the two-dimensional code to Len!".

It can be understood that, if the mobile phone A obtains the verification information, the mobile phone A may obtain the second account and the shared key Ps by using the verification information. Then, the mobile phone A may obtain the shared block from the server 100 based on the second account. Finally, the mobile phone A may decrypt the shared block by using the shared key Ps, to obtain the public key of the mobile phone B, the first challenge code, and the message leaving key Pom. Specifically, after the procedure (3), the method in this embodiment of this application may further include the procedure (4):

As shown in FIG. 6A-1 to FIG. 6A-3, the procedure (4), that is, the procedure in which the mobile phone A shares a key with the mobile phone B and the camera X, may include S401 to S409.

S401: The mobile phone A obtains the verification information, and obtains the second account and the shared key Ps by using the verification information.

For example, the verification information is a two-dimensional code. A user of the mobile phone B may directly present the foregoing two-dimensional code to the user of the mobile phone A, and the user of the mobile phone A operates the mobile phone A and scans the two-dimensional code. For example, the mobile phone A may scan the two-dimensional code by using a "scan" function in the first app.

Alternatively, the mobile phone B may receive a tap operation performed by the user on a "Share" button 801 shown in FIG. 8. In response to the tap operation performed by the user on the "Share" button 801, the mobile phone B may invoke the first app or an instant messaging application (such as WeChat or QQ) to send the two-dimensional code to the mobile phone A.

Figure 9:
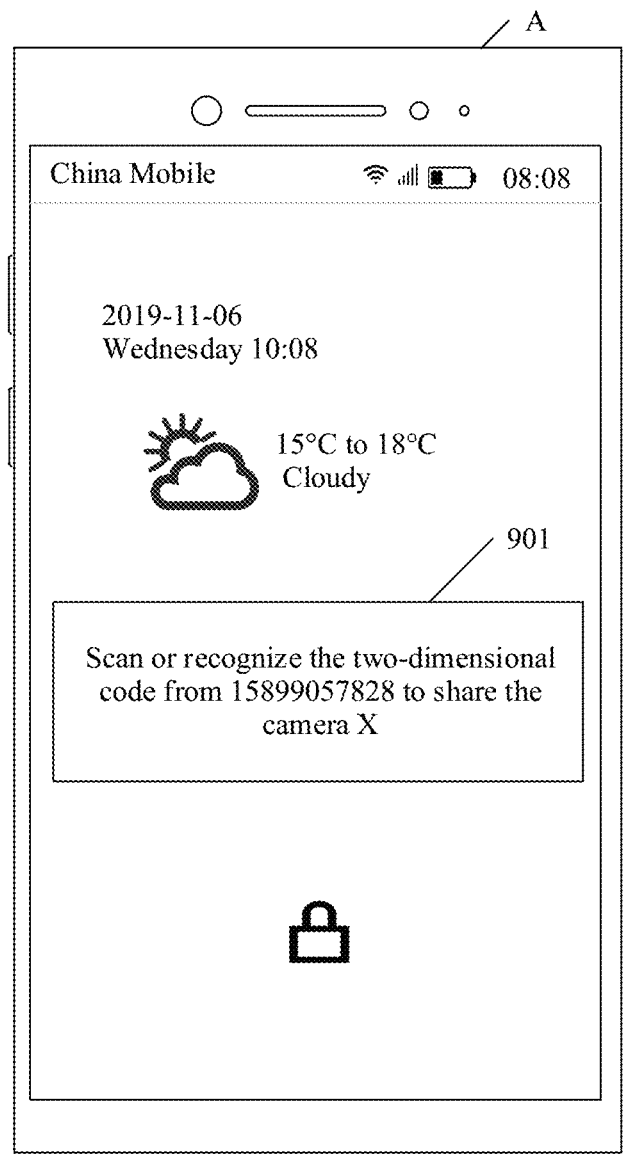
FIG. 9 is a schematic diagram of a display interface of another device according to an embodiment of this application.

After receiving the two-dimensional code, the mobile phone A may prompt the user to scan or recognize the two-dimensional code. For example, the mobile phone A may display prompt information "Scan or recognize the two-dimensional code from 15899057828 to share the camera X" 901 shown in FIG. 9. In response to a tap operation performed by the user on the prompt information 901, the mobile phone A may display a scanning or recognition interface of the two-dimensional code after unlocking, so that the user A operates the mobile phone A to scan or recognize the two-dimensional code.

S402: The mobile phone A obtains the shared block from the server 100 based on the second account.

For example, the mobile phone A may send a shared block obtaining request including the second account to the server 100, to obtain the shared block from the server 100.

It can be understood that another device may also obtain the shared block from the server 100 based on the second account. However, the another device does not learn of the shared key Ps, and therefore cannot decrypt the shared block. Therefore, even if the another device obtains the shared block from the server 100, the another device cannot obtain a public key, the first challenge code, and the message leaving key Pom in the shared block. In this way, information security in the shared block can be protected.

S403: The mobile phone A decrypts the shared block by using the shared key Ps, to obtain the public key of the mobile phone B, the first challenge code, and the message leaving key Pom.

After obtaining the public key of the mobile phone B, the mobile phone A may implement an online message with the mobile phone B. After obtaining the message leaving key Pom of the mobile phone B, the mobile phone A can implement an offline message with the mobile phone B. In this way, the mobile phone A may share related information of the camera X with the mobile phone B by using an offline message, so as to implement offline sharing of the camera X.

It can be learned from S203 in the procedure (2) that the first request message sent by the mobile phone A to the server 100 is unencrypted. Therefore, the second challenge code in the first request message may be tampered with by the server 100. If the server 100 tampers with the second challenge code in the first request message after receiving the first request message, the challenge code sent by the server 100 to the mobile phone B in S302 is a tampered challenge code, in other words, the first challenge code is different from the second challenge code. In this case, to protect user information security and prevent the user information security from being affected after the camera X is shared, the mobile phone A may end the home device sharing procedure. Specifically, the method in this embodiment of this application further includes S404.

S404: The mobile phone A determines whether the first challenge code is the same as the second challenge code.

The mobile phone A may store the second account and the second challenge code generated for the second account. After performing S403 to obtain the first challenge code, the mobile phone A may compare the second challenge code with the first challenge code to determine whether the two challenge codes are the same. If the two challenge codes are the same, it indicates that the challenge code is not tampered with. If the two challenge codes are different, it indicates that the challenge code is tampered with.

Specifically, if the first challenge code is different from the second challenge code (in other words, if the challenge code is tampered with), the mobile phone A may end the home device sharing process. If the first challenge code is the same as the second challenge code (in other words, if the challenge code is not tampered with), the mobile phone A may perform S405. It should be noted that S404 is optional. The mobile phone A may directly perform S405 without performing S404.

S405: The mobile phone A generates the message leaving key Pom.

The message leaving key Pmd is used to encrypt an offline message between the mobile phone B and the camera X. After S405, the method in this embodiment of this application further includes S406, S407, S408, and S409.

S406: The mobile phone A encrypts the public key of the mobile phone B and the message leaving key Pmd by using the message leaving key Pod, to obtain first encrypted information.

The mobile phone A may request the server 100 to push the first encrypted information to the camera X. For example, the mobile phone A may send a second request message to the server 100 to request the server to push the first encrypted information to the camera X.

S407: The mobile phone A sends the second request message to the server 100, where the second request message includes the first encrypted information, and the second request message is used to request the server 100 to push the first encrypted information to the camera X.

The second request message may further include the identifier of the camera X. In this way, in response to the second request message, the server 100 may send the first encrypted information to the camera X based on the identifier of the camera X.

It can be understood that the message leaving key Pod is used to encrypt an offline message between the mobile phone A and the camera X. Both the mobile phone A and the camera X learn of the message key Pod, but the server 100 does not learn of the message leaving key Pod. In this case, the server 100 cannot decode the first encrypted information, and therefore cannot learn of the public key of the mobile phone B and the message leaving key Pmd, so that user information security can be protected.

In some other embodiments, to further protect the user information security, before encrypting the public key of the mobile phone B and the message leaving key Pmd by using the message leaving key Pod, the mobile phone A may sign the public key of the mobile phone B and the message leaving key Pmd by using the private key of the mobile phone A, and then encrypt the signed information by using the message leaving key Pod, to obtain the first encrypted information.

In this embodiment, the camera X may decrypt the first encrypted information by using the message leaving key Pod, to obtain the public key of the mobile phone B and the message leaving key Pmd. Then, the camera X may perform signature verification on the public key of the mobile phone B and the message leaving key Pmd by using the public key of the mobile phone A, to determine whether the public key of the mobile phone B and the message leaving key Pmd are tampered with. In S108 of the procedure (1), the camera X obtains the public key of the mobile phone A.

S408: The mobile phone A encrypts the public key of the camera X, the public key of the mobile phone A, and the message leaving key Pmd by using the message leaving key Pom, to obtain second encrypted information.

The mobile phone A may request the server 100 to push the second encrypted information to the mobile phone B that is logged in to by using the second account. For example, the mobile phone A may send a third request message to the server 100, where the third request message includes the second account and the second encrypted information.

S409: The mobile phone A sends the third request message to the server 100, where the third request message includes the second account and the second encrypted information, and the third request message is used to request the server 100 to send the second encrypted information to the mobile phone B that is logged in to by using the second account.

It can be understood that the message leaving key Pom is used to encrypt an offline message between the mobile phone A and the mobile phone B. Both the mobile phone A and the mobile phone B learn of the message leaving key Pom, but the server 100 does not learn of the message leaving key Pom. In this case, the server 100 cannot decode the second encrypted information, and therefore cannot learn of the public key of the camera X, the public key of the mobile phone A, and the message leaving key Pmd, so that user information security can be protected.

Figure 10:
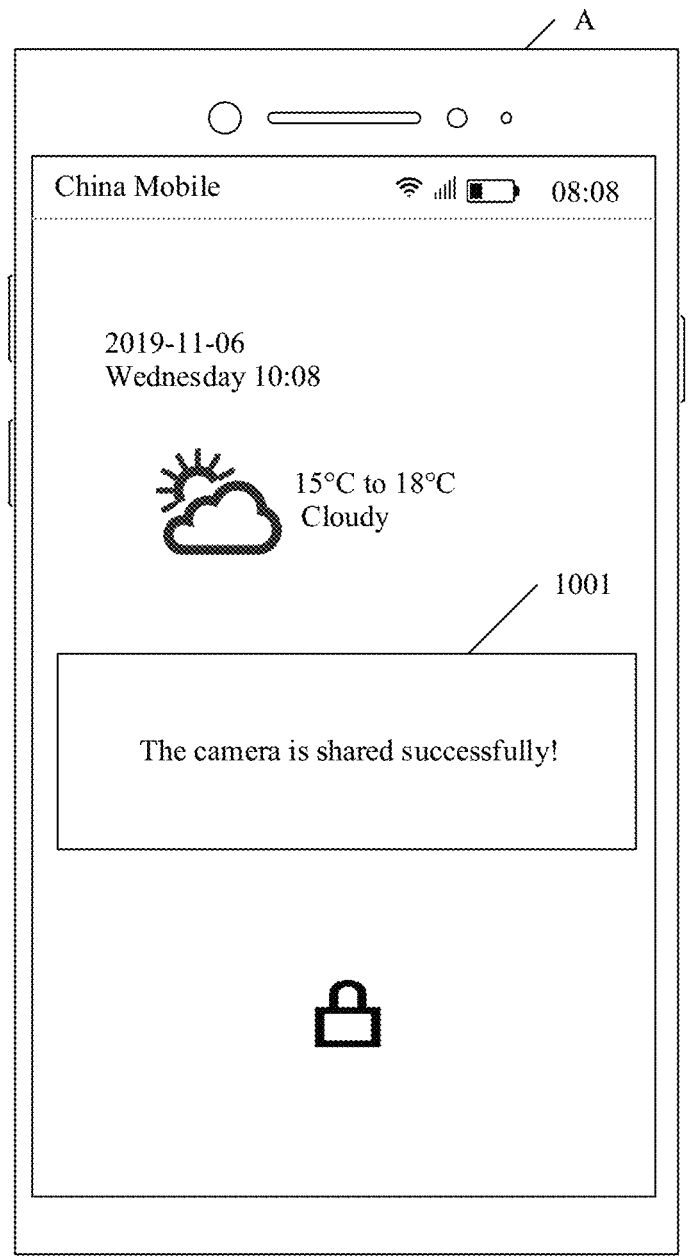
FIG. 10 is a schematic diagram of a display interface of another device according to an embodiment of this application.

In one embodiment, after S407 and S409, the mobile phone A may further send fifth prompt information. The fifth prompt information is used to prompt the user that the camera X is successfully shared. For example, the mobile phone A may display fifth prompt information 1001 "The camera is shared successfully!" shown in FIG. 10.

It can be understood that, after S407 and S409, the server 100 may send the public key of the camera X and the message leaving key Pmd to the mobile phone B, and send the public key of the mobile phone B and the message leaving key Pmd to the camera X. In this way, the mobile phone B and the camera X may learn of the respective public keys and the message leaving key Pmd that is used to encrypt an offline message, so that the mobile phone B can send an online message or an offline message to the camera X. Therefore, the mobile phone B can control the camera X by using an online message or an offline message.

Specifically, after the procedure (4), the method in this embodiment of this application may further include the procedure (5): In the procedure (5), the mobile phone B and the camera X may learn of the respective public keys and the message leaving key Pmd that is used to encrypt an offline message.

Figure 11A:
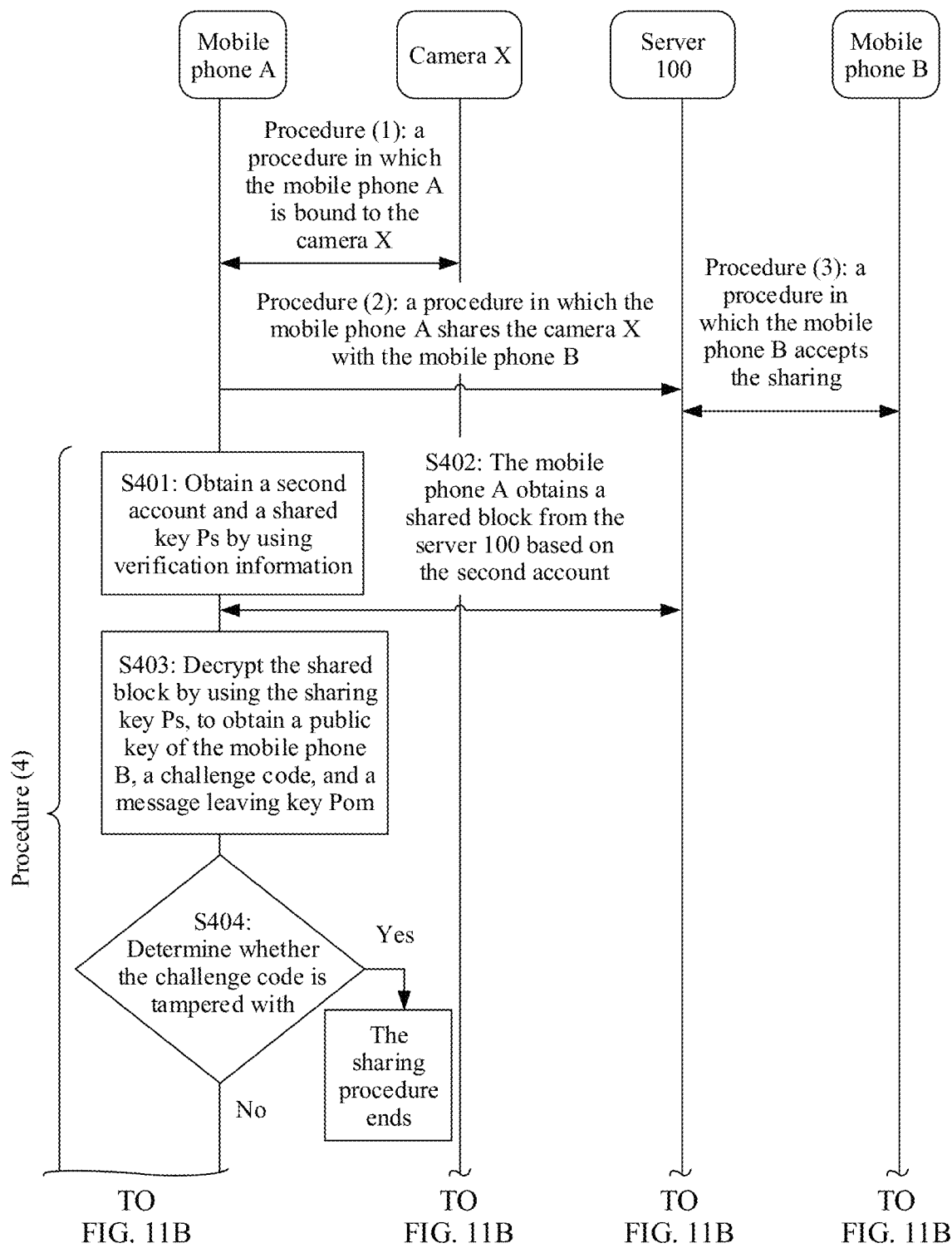
FIG. 11A to FIG. 11C are flowcharts of another device sharing method according to an embodiment of this application.
Figure 11B:
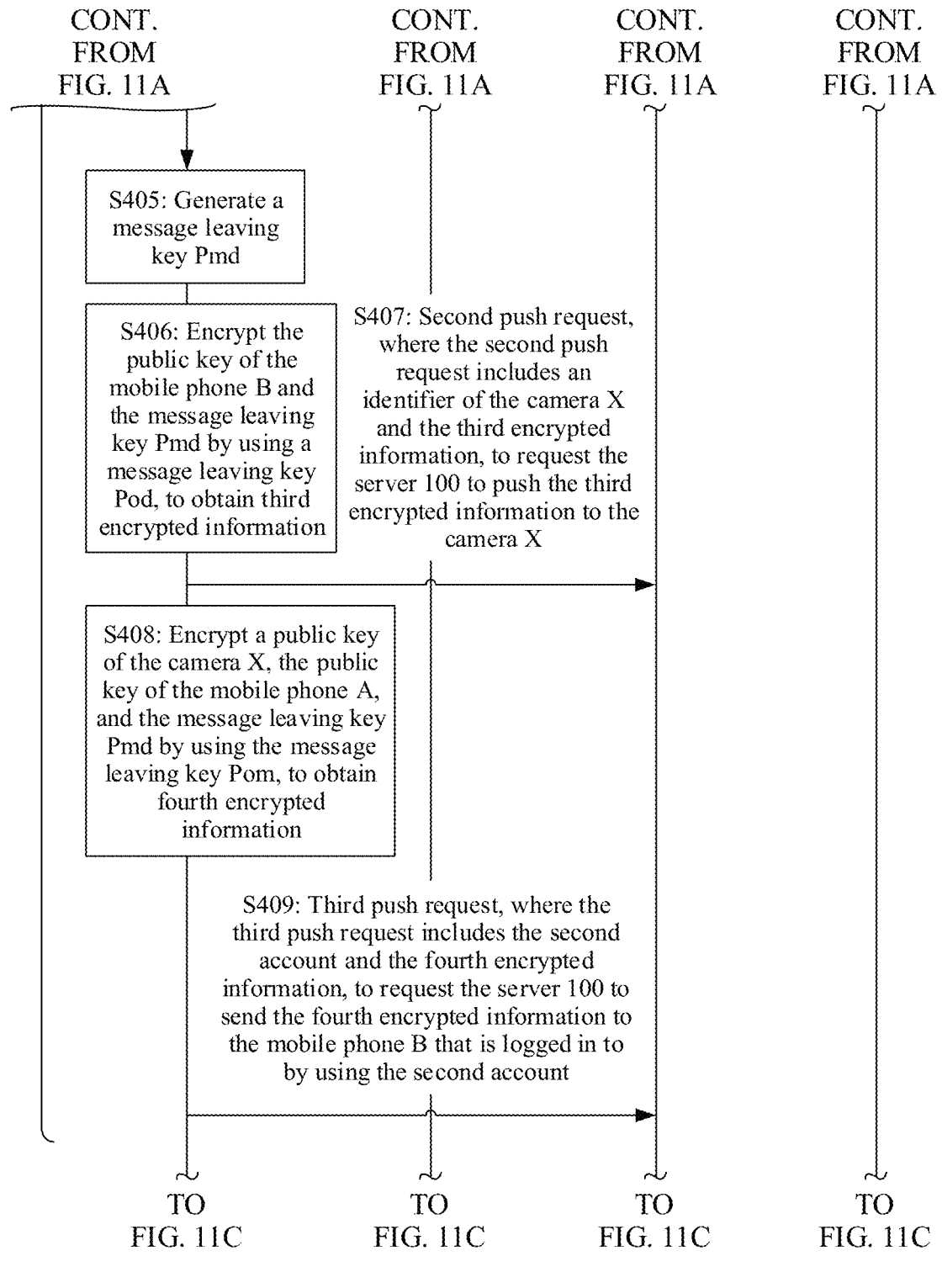
Figure 11C:
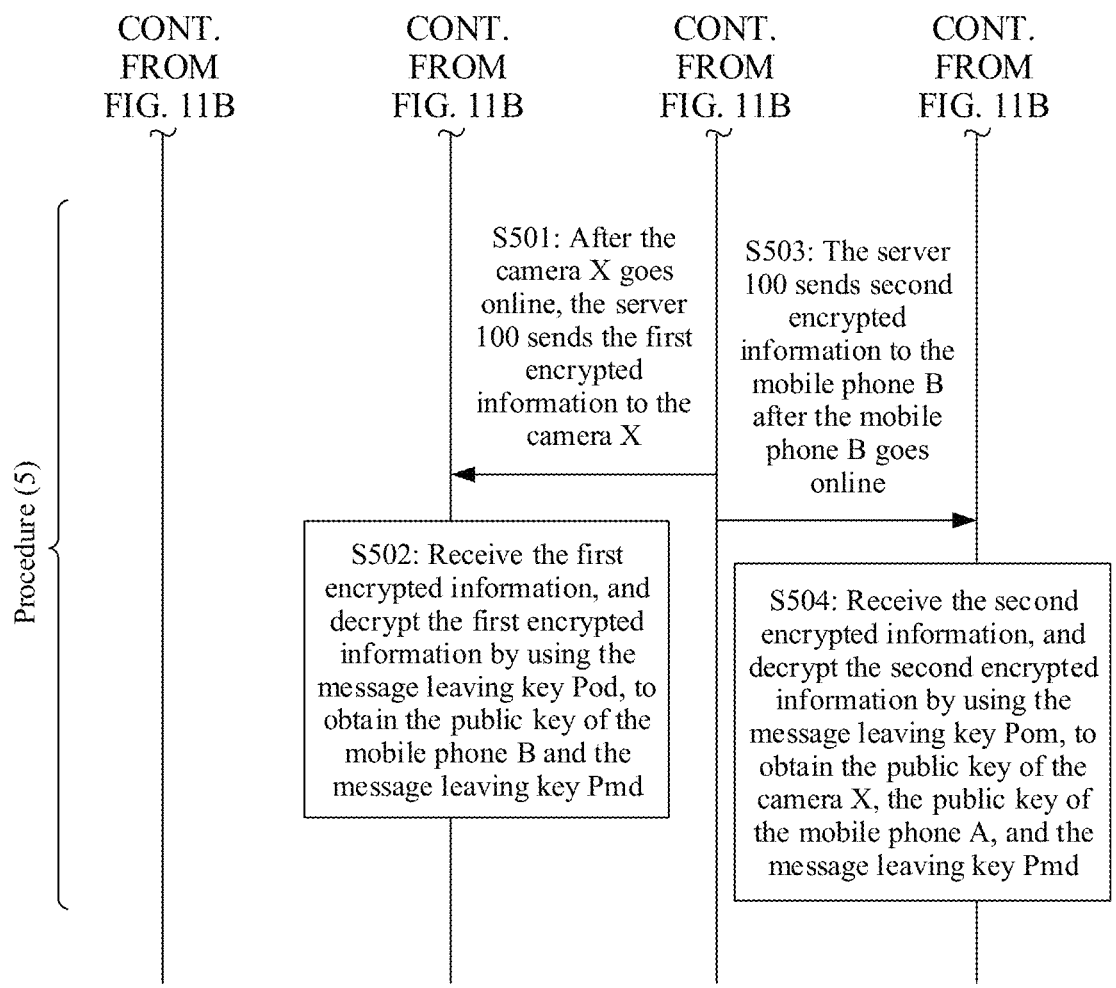

As shown in FIG. 11A to FIG. 11C, the procedure (5), that is, the procedure in which the mobile phone B and the camera X obtain the key to complete the device sharing may include S501 to S504.

S501: The server 100 sends the first encrypted information to the camera X after the camera X goes online.

That the camera X goes online means that the camera X is powered on and connected to a network (for example, the second wireless network). In some other embodiments, after the camera X goes online, the camera X may further actively obtain, from the server 100, an offline message (for example, the first encrypted information) sent by another device to the camera X.

S502: The camera X receives the first encrypted information, and decrypts the first encrypted information by using the message leaving key Pod, to obtain the public key of the mobile phone B and the message leaving key Pmd.

After obtaining the public key of the mobile phone B, the camera X may perform signature verification on an online message from the mobile phone B. After obtaining the message leaving key Pmd, the camera X may decrypt an offline message from the mobile phone B and perform offline communication with the mobile phone B.

S503: The server 100 sends the second encrypted information to the mobile phone B after the mobile phone B goes online.

For detailed descriptions of going online of the mobile phone B, refer to the content in S301 and S302. Details are not described herein again in this embodiment of this application. In some other embodiments, after going online, the mobile phone B may further actively obtain, from the server 100, an offline message (for example, the second encrypted information) sent by another device to the mobile phone B.

S504: The mobile phone B receives the second encrypted information, and decrypts the second encrypted information by using the message leaving key Pom, to obtain the public key of the camera X, the public key of the mobile phone A, and the message leaving key Pmd.

After obtaining the public key of the camera X, the mobile phone B may perform signature verification on an online message from the camera X. After obtaining the message leaving key Pmd, the mobile phone B may decrypt the offline message from the camera X and perform offline communication with the camera X.

In conclusion, after the mobile phone B and the camera X may learn of the respective public keys and the message leaving key Pmd that is used to encrypt an offline message, the mobile phone B and the camera X may perform offline communication. In this case, the mobile phone B obtains control of the camera X, and the user can control the camera X on the mobile phone B that is logged in to by using the second account.

It should be noted that the message leaving key Pmd is generated by the mobile phone A, for example, is generated by the mobile phone A by performing S405. The mobile phone A transmits the message key Pmd to the mobile phone B and the camera X through encryption. For example, the message leaving key Pmd sent by the mobile phone A to the mobile phone B is encrypted by using the message leaving key Pom, and the message leaving key Pmd sent by the mobile phone A to the camera X is encrypted by using the message leaving key Pod. Therefore, if the server 100 does not learn of the message leaving key Pom and the message leaving key Pod, the server 100 cannot learn of the message leaving key Pmd. In this case, the server 100 cannot decrypt the offline message between the mobile phone B and the camera X either, so that user information security can be protected.

In one embodiment, after the mobile phone B obtains the public key of the camera X, the public key of the mobile phone A, and the message leaving key Pmd (that is, S504), the method in this embodiment of this application may further include: The mobile phone B sends sixth prompt information. The sixth prompt information is used to prompt the user that the mobile phone B has obtained control of the camera X, and the mobile phone B can control the camera X.

In this embodiment of this application, first, in the process in which the mobile phone A is bound to the camera X, the mobile phone A may exchange the respective public keys with the camera X, and determine the message leaving key Pod used to encrypt the offline message between the mobile phone A and the camera X. Then, the mobile phone A may exchange the respective public keys with the mobile phone B by using the server 100, and determine the message leaving key Pod used to encrypt the offline message between the mobile phone A and the mobile phone B. Finally, the mobile phone A may indicate the public key of the camera X and the message leaving key Pmd (used to encrypt the offline message between the mobile phone B and the camera X) to the mobile phone B, and indicate the public key of the mobile phone B and the message leaving key Pmd to the camera X.

In this way, the mobile phone B and the camera X may learn of the respective public keys and the message leaving key Pmd, and may perform offline communication, so that the mobile phone B obtains control of the camera X. In conclusion, this solution can implement offline sharing of a home device (for example, the camera X), and can further improve information security in the home device sharing process.

In some embodiments, both the public key of the camera X and the message leaving key Pod may be used to help the user to log in to different devices by using the first account. After obtaining the public key of the camera X and the message leaving key Pod, the mobile phone A may encrypt the public key of the camera X and the message leaving key Pod by using an account data key of the first account, and request the server 100 to store encrypted information based on the identifier of the camera X. In this way, when the user logs in to different devices by using the first account, each device that is logged in to by using the first account may obtain the public key of the camera X and the message leaving key Pod from the server 100.

Similarly, after obtaining the public key of the mobile phone B and the message leaving key Pom, the mobile phone A encrypts the public key of the mobile phone B (that is, the public key of the second account) and the message leaving key Pom by using the account data key of the first account, and requests the server 100 to store encrypted information based on the second account. In this way, when the user logs in to different devices by using the first account, each device that is logged in to by using the first account may obtain the public key of the mobile phone B and the message leaving key Pom from the server 100.

After generating the foregoing challenge code, the mobile phone A may also encrypt the challenge code by using the account data key of the first account, and request the server 100 to store encrypted challenge code based on the first account. The server 100 may store the encrypted challenge code based on the first account. In this way, when the user logs in to different devices by using the first account, each device that is logged in to by using the first account may obtain the challenge code from the server 100, and share a home device by using the challenge code.

The account data key of the first account is used to encrypt data related to the first account that is stored in the server 100. The account data key is generated by the mobile phone A or set by the user.

It should be noted that the account data key is not the login password for the first account. However, the account data key may be the same as the login password for the first account. For example, for ease of memorization, the user may set the account data key to be the same as the login password for the first account. Certainly, the account data key may alternatively be different from the login password for the first account. This is not limited in this embodiment of this application.

Certainly, the public key of the camera X, the message leaving key Pmd, the public key of the mobile phone A, and the message leaving key Pom all may be used to help the user to log in to different devices by using the second account. After obtaining the public key of the camera X and the message leaving key Pmd, the mobile phone A may encrypt the public key of the camera X and the message leaving key Pmd by using the account data key of the first account, and request the server 100 to store encrypted information based on the identifier of the camera X. After obtaining the public key of the mobile phone A and the message leaving key Pom, the mobile phone A may encrypt the public key of the mobile phone A and the message leaving key Pom by using the account data key of the first account, and request the server 100 to store encrypted information based on the first account.

For detailed descriptions of the account data key of the second account, refer to the descriptions of the account data key of the first account in this embodiment of this application. Details are not described herein again in this embodiment of this application.

Some other embodiments of this application provide an electronic device (the electronic device 200 shown in FIG. 2). The electronic device may include a communications module, a memory, and one or more processors. The communications module, the memory, and the processor are coupled. The memory is configured to store computer program code, where the computer program code includes computer instructions.

The electronic device may be a first device or a second device. When the electronic device is the first device, and the processor executes the computer instructions, the first device may perform the functions or the operations performed by the mobile phone A in the foregoing method embodiments. When the electronic device is the second device, and the processor executes the computer instructions, the second device may perform the functions or the operations performed by the mobile phone B in the foregoing method embodiments. For a structure of the electronic device, refer to the structure of the electronic device 200 shown in FIG. 2.

Figure 12:
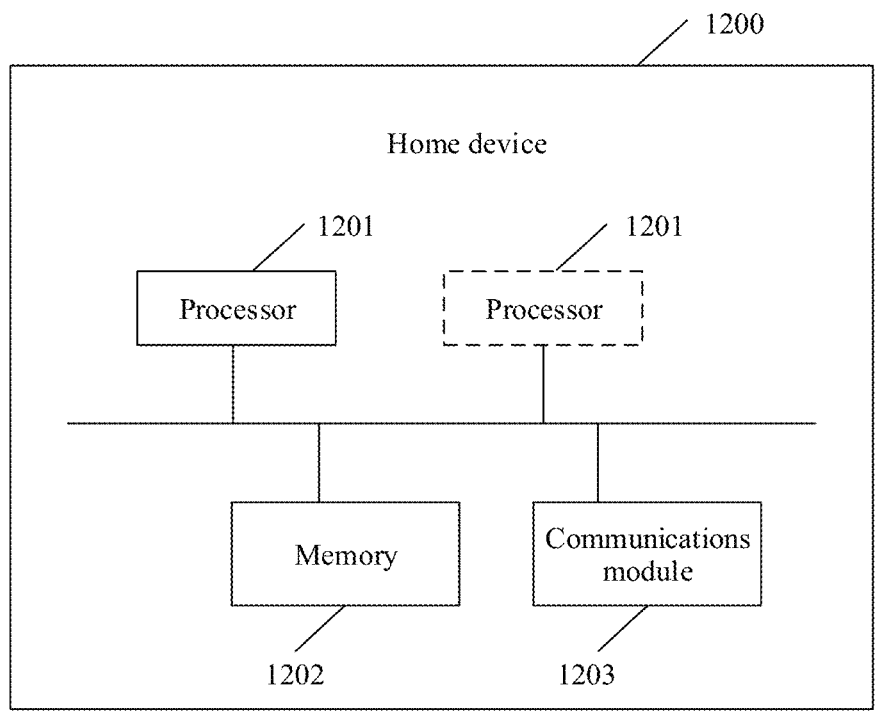
FIG. 12 is a schematic structural diagram of a home device according to an embodiment of this application.

Another embodiment of this application provides a home device, and the home device is a first home device. As shown in FIG. 12, the home device 1200 includes a communications module 1203, a memory 1202, and one or more processors 1201. The communications module 1203, the memory 1202, and the processor 1201 are coupled. For example, the communications module 1203 may be a Wi-Fi module.

The memory 1202 is configured to store computer program code, where the computer program code includes computer instructions. When the computer instructions are executed by the processor 1201, the home device 1200 is enabled to perform the functions or operations performed by the camera X in the foregoing method embodiment.

Figure 13:
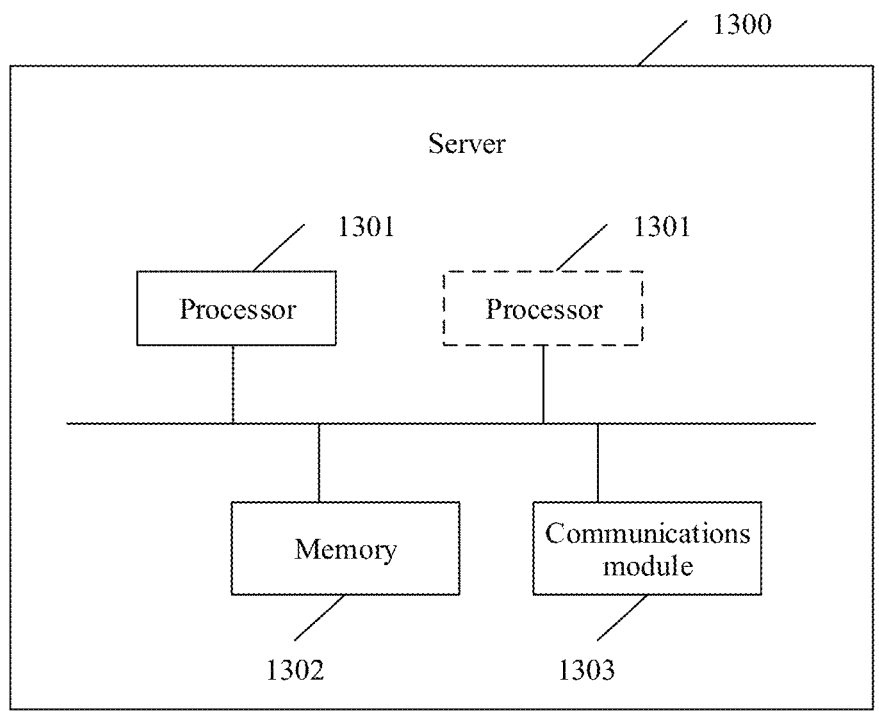
FIG. 13 is a schematic structural diagram of a server according to an embodiment of this application.

Another embodiment of this application provides a server. As shown in FIG. 13, the server 1300 includes a communications module 1303, a memory 1302, and one or more processors 1301. The communications module 1303, the memory 1302, and the processor 1301 are coupled. The memory 1302 is configured to store computer program code, where the computer program code includes computer instructions. When the computer instructions are executed by the processor 1301, the server 1300 is enabled to perform the functions or operations performed by the server 100 in the foregoing method embodiment.

Figure 14:
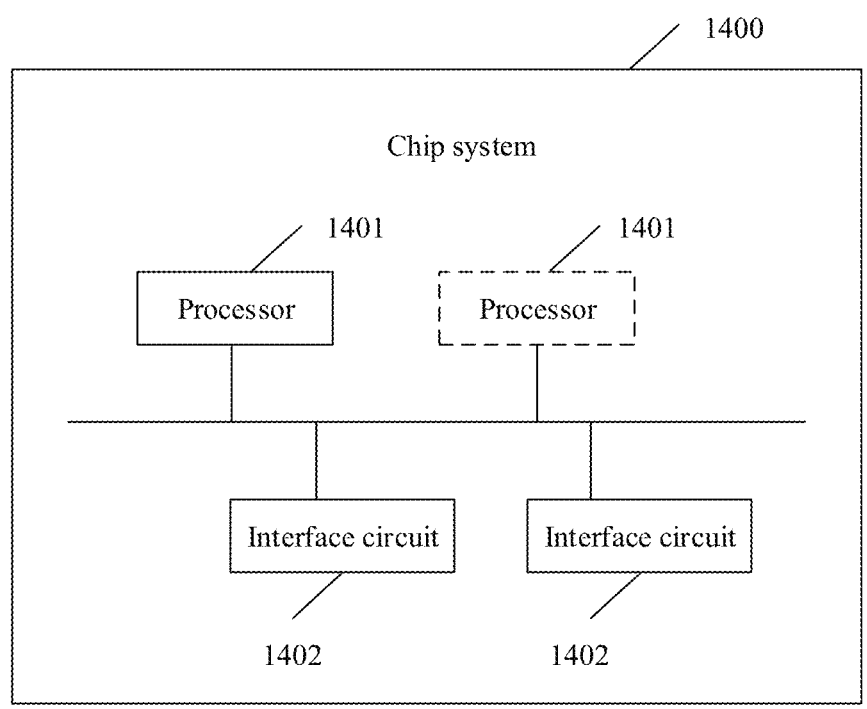
FIG. 14 is a schematic structural diagram of a chip system according to an embodiment of this application.

Another embodiment of this application provides a chip system. As shown in FIG. 14, the chip system 1400 includes at least one processor 1401 and at least one interface circuit 1402. The processor 1401 and the interface circuit 1402 may be connected to each other through a line. For example, the interface circuit 1402 may be configured to receive a signal from another apparatus (for example, a memory in an electronic device, a memory in a home device, or a memory in a server). For another example, the interface circuit 1402 may be configured to send a signal to another apparatus (for example, the processor 1401).

For example, the interface circuit 1402 may read instructions stored in the memory in the electronic device, and send the instructions to the processor 1401. When the instructions are executed by the processor 1401, the electronic device (for example, the electronic device 200 shown in FIG. 2) is enabled to perform the operations in the foregoing embodiment.

For another example, the interface circuit 1402 may read instructions stored in the memory in the home device, and send the instructions to the processor 1401. When the instructions are executed by the processor 1401, the home device (for example, the home device 1200 shown in FIG. 12) is enabled to perform the operations in the foregoing embodiment.

For another example, the interface circuit 1402 may read instructions stored in the memory in the server, and send the instructions to the processor 1401. When the instructions are executed by the processor 1401, the server (for example, the server 1300 shown in FIG. 13) is enabled to perform the operations in the foregoing embodiment.

Certainly, the chip system may further include another discrete device. This is not specifically limited in this embodiment of this application.

An embodiment of this application further provides a computer-readable storage medium. The computer-readable storage medium includes computer instructions. When the computer instructions are run on an electronic device (for example, the electronic device 200 shown in FIG. 2), the electronic device is enabled to perform the functions or operations performed by the mobile phone A or the mobile phone B in the foregoing method embodiment.

An embodiment of this application further provides a computer program product. When the computer program product is run on a computer, the computer is enabled to perform the functions or operations performed by the mobile phone A or the mobile phone B in the foregoing method embodiment.

An embodiment of this application further provides a computer-readable storage medium. The computer-readable storage medium includes computer instructions. When the computer instructions are run on a home device (for example, the home device 1200 shown in FIG. 12), the home device is enabled to perform the functions or operations performed by the camera X in the foregoing method embodiment.

An embodiment of this application further provides a computer program product. When the computer program product is run on a computer, the computer is enabled to perform the functions or operations performed by the camera X in the foregoing method embodiment.

An embodiment of this application further provides a computer-readable storage medium. The computer-readable storage medium includes computer instructions. When the computer instructions are run on a server (for example, the server 1300 shown in FIG. 13), the server is enabled to perform the functions or operations performed by the server 100 in the foregoing method embodiment.

An embodiment of this application further provides a computer program product. When the computer program product is run on a computer, the computer is enabled to perform the functions or operations performed by the server 100 in the foregoing method embodiment.

The foregoing descriptions about the implementations allow a person skilled in the art to clearly understand that, for convenient and brief description, division of the foregoing function modules is used as an example for illustration. During actual application, the foregoing functions can be allocated to different function modules and implemented according to a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be another division during actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, in other words, may be located in one place, or may be distributed on a plurality of different places. Some or all of the units may be selected according to actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A first device, comprising
a communications module;
a memory; and
one or more processors, wherein the communications module, the memory, and the one or more processors are coupled, wherein the memory is configured to store computer program code comprising computer instructions, which when executed by the one or more processors, cause the first device to:
obtain a first message leaving key, wherein the first message leaving key is used to encrypt an offline message between the first device and a first home device;
obtain a public key of the first home device, wherein the public key of the first home device is used to perform verification on an online message from the first home device;
obtain a second message leaving key and a public key of a second account, wherein the second message leaving key is used to encrypt an offline message between the first device and a second device, wherein the second account is an account associated with a first application (app) installed on the second device, wherein the first app is logged in to by using a first account, and wherein the public key of the second account is used to perform verification on an online message from the second device;
obtain a third message leaving key, wherein the third message leaving key is used to encrypt an offline message between the second device and the first home device;
encrypt the public key of the second account and the third message leaving key by using the first message leaving key, to obtain first encrypted information, and request a server to push the first encrypted information to the first home device; and
encrypt the public key of the first home device and the third message leaving key by using the second message leaving key, to obtain second encrypted information, and request the server to push the second encrypted information to the second device.

2. The first device according to claim 1, wherein the first device is further to:
access a first wireless network provided by the first home device;
negotiate a shared key with the first home device over the first wireless network by using a password authenticated key exchange (PAKE) protocol;
receive third encrypted information from the first home device over the first wireless network, wherein the third encrypted information is obtained by encrypting the public key of the first home device by using the shared key; and
decrypt the third encrypted information by using the shared key, to obtain the public key of the first home device.

3. The first device according to claim 2, wherein the first device is further to:
generate the first message leaving key;
encrypt a public key of the first account, the first message leaving key, and access information of a second wireless network by using the shared key, to obtain fourth encrypted information, wherein the access information comprises an identifier and an access password of the second wireless network, and the public key of the first account is used to perform verification on an online message from the first device; and
send the fourth encrypted information to the first home device over the first wireless network.

4. The first device according to claim 1, wherein the first device is further to:
obtain verification information of the second device, wherein the verification information comprises the second account and a shared key;
obtain a shared block from the server based on the second account, wherein the shared block is obtained by the second device by encrypting the public key of the second account and the second message leaving key by using the shared key, and is uploaded to the server; and
decrypt the shared block by using the shared key, to obtain the public key of the second account and the second message leaving key.

5. The first device according to claim 4, wherein the first device further comprises a display; and
wherein the first device is further to:
display a first interface of the first app, wherein the first interface is used to manage one or more home devices;
receive a first operation performed by a user on the first interface, wherein the first operation is used to trigger the first device to share the first home device with the second device; and
in response to the first operation, send a first request message, to the server, to request the server to indicate the second device to generate the verification information and upload the shared block to the server.

6. The first device according to claim 5, wherein the shared block further comprises a first challenge code; and
wherein the first device is further to:
decrypt the shared block by using the shared key, to obtain the first challenge code;
determine whether the first challenge code is the same as a second challenge code generated by the first device for the second account; and
in response to that the first challenge code is the same as the second challenge code, generate the third message leaving key.

7. The first device according to claim 5, wherein the first device is further to:
in response to the first operation, generate a second challenge code for the second account, wherein the first request message further comprises the second challenge code.

8. A second device, comprising:
a first application (app) installed on the second device, wherein the first app is logged in to by using a second account;
a communications module;
a memory; and
one or more processors, wherein the communications module, the memory, and the one or more processors are coupled, wherein the memory is configured to store computer program code comprising computer instructions, which when executed by the one or more processors, cause the second device to:
obtain a second message leaving key, wherein the second message leaving key is used to encrypt an offline message between a first device and the second device;
receive second encrypted information from a server, wherein the second encrypted information is obtained by encrypting a public key of a first home device and a third message leaving key by using the second message leaving key, wherein the public key of the first home device is used to perform verification on an online message from the first home device, and wherein the third message leaving key is used to encrypt an offline message between the second device and the first home device; and
decrypt the second encrypted information by using the second message leaving key, to obtain the public key of the first home device and the third message leaving key.

9. The second device according to claim 8, wherein, the second device is further to:
receive a first challenge code from the server; and
generate the second message leaving key.

10. The second device according to claim 9, wherein the second device is further to:
generate a shared key after receiving the first challenge code from the server;
encrypt a public key of the second account, the first challenge code, and the second message leaving key by using the shared key, to obtain a shared block; and
send the shared block to the server.

11. The second device according to claim 10, wherein the second device is further to:
after receiving the first challenge code from the server, generate verification information, and display the verification information comprising the second account and the shared key; and
wherein the verification information comprises at least one of a two-dimensional code, a bar code, or an electronic label.

12. A first home device, comprising
a communications module;
a memory; and
one or more processors, wherein the communications module, the memory, and the one or more processors are coupled, the memory is configured to store computer program code comprising computer instructions, which when executed by the one or more processors, cause the first home device to:
obtain a first message leaving key, wherein the first message leaving key is used to encrypt an offline message between a first device and the first home device;
receive first encrypted information from a server, wherein the first encrypted information is obtained by encrypting a public key of a second account and a third message leaving key by using the first message leaving key, wherein the second account is an account associated with a first application (app) installed on a second device, wherein the public key of the second account is used to perform verification on an online message from the second device, and wherein the third message leaving key is used to encrypt an offline message between the second device and the first home device; and
decrypt the first encrypted information by using the first message leaving key, to obtain the public key of the second account and the third message leaving key.

13. The first home device according to claim 12, wherein the first home device is further to:
provide a first wireless network, and allow the first device to access the first wireless network;
negotiate a shared key with the first device over the first wireless network by using a password authenticated key exchange (PAKE) protocol;
receive fourth encrypted information from the first device over the first wireless network, wherein the fourth encrypted information is encrypted by using the shared key, and wherein the fourth encrypted information comprises the first message leaving key; and
decrypt the fourth encrypted information by using the shared key, to obtain the first message leaving key.

14. A server, comprising:
a communications module;
a memory; and
one or more processors, wherein the communications module, the memory, and the processor are coupled, the memory is configured to store computer program code comprising computer instructions, which when executed by the processor, cause the server to:
receive a second request message from a first device, wherein the second request message comprises first encrypted information and an identifier of a first home device, wherein the first encrypted information is obtained by encrypting a public key of a second account and a third message leaving key, wherein the third message leaving key is used to encrypt an offline message between a second device that is logged in to by using the second account and the first home device, wherein the second account is an account associated with a first application (app) installed on the second device, and wherein the public key of the second account is used to perform verification on an online message from the second device;
in response to the second request message, send the first encrypted information to the first home device;
receive a third request message from the first device, wherein the third request message comprises second encrypted information and the second account, wherein the second encrypted information is obtained by encrypting a public key of the first home device and the third message leaving key, and wherein the public key of the first home device is used to perform verification on an online message from the first home device; and
in response to the third request message, send the second encrypted information to the second device after the first application app of the second device is logged in to by using the second account.

15. The server according to claim 14, wherein the first encrypted information is obtained by encrypting the public key of the second account and the third message leaving key by using a second message leaving key; and wherein the server is further to:

before receiving the third request message from the first device, receive a shared block from the second device, and store the shared block based on the second account, wherein the shared block is encrypted, and wherein the shared block comprises a public key of the second device and the second message leaving key;

receive an obtaining request from the first device, wherein the obtaining request is used to obtain the shared block corresponding to the second account; and in response to the obtaining request, send the shared block to the first device.

* * * * *